United States Patent
Adams et al.

(10) Patent No.: US 11,500,906 B1
(45) Date of Patent: Nov. 15, 2022

(54) CONSTRAINT OPTIMIZATION PROBLEM SOLVING ON SUBFEATURES OF A SUBGRAPH OF A NETWORK WITH CLASSIFICATION OF FEATURES OF VERBAL ELEMENTS IN SUBGRAPHS

(71) Applicant: Decision Lens, Inc., Arlington, VA (US)

(72) Inventors: William James Louis Adams, DeLand, FL (US); Kevin John Connor, New Hope, PA (US); Gavin Thomas Byrnes, Arlington, VA (US)

(73) Assignee: Decision Lens Inc., Arlington, VA (US)

( * ) Notice: Subject to any disclaimer, the term of this patent is extended or adjusted under 35 U.S.C. 154(b) by 26 days.

(21) Appl. No.: 16/953,236

(22) Filed: Nov. 19, 2020

(51) Int. Cl.
*G06F 16/28* (2019.01)

(52) U.S. Cl.
CPC .................. *G06F 16/285* (2019.01)

(58) Field of Classification Search
CPC .... G06F 3/0655; G06F 16/285; G06F 3/0604; G06F 3/0676; G06F 3/0677; G06F 3/0679; G06F 16/00
See application file for complete search history.

(56) References Cited

U.S. PATENT DOCUMENTS

| | | | |
|---|---|---|---|
| 7,593,880 B2 | 9/2009 | Chalermkraivuth et al. | |
| 7,640,201 B2 | 12/2009 | Chalermkraivuth et al. | |
| 9,146,945 B2 | 9/2015 | Kumar et al. | |
| 10,120,916 B2 | 11/2018 | Faruquie et al. | |
| 2006/0271210 A1 | 11/2006 | Subbu et al. | |
| 2009/0319457 A1* | 12/2009 | Cheng | G06N 20/20 706/46 |
| 2011/0125737 A1* | 5/2011 | Pothering | G06F 16/335 707/E17.014 |
| 2017/0351406 A1* | 12/2017 | Rossi | G06F 16/2455 |

(Continued)

OTHER PUBLICATIONS

Jiri Franek et al., "Judgement scales and consistency measure in AHP." Procedia Economica and Finance 12 (2014) pp. 164-173. Enterprise and the Competitive Environment 2014 conference, ECE 2014, Mar. 6-7, 2014. Brno, Czech Republic.

(Continued)

*Primary Examiner* — Son T Hoang
(74) *Attorney, Agent, or Firm* — Posz Law Group, PLC

(57) ABSTRACT

A subgraph storage memory stores subgraphs populated with data classified into features based on data title; each of the subgraphs has a plurality of elements; each of the elements has a features with different values. For each subfeature of a plurality of subfeatures, the different values assigned to a combination of one of the elements and one or more features are used to create a method to evaluate the subgraphs on the one or more features, as a subfeature which provides scoring information on a subgraph. For each metafeature, plural subfeatures among the plurality of subfeatures are selected to be composited into the metafeature; and for each subgraph, the plural subfeatures of each metafeature are composited to provide metafeature scores. Selected subgraphs in a universe of subgraphs with metafeature scores are presented as context for comparing the selected subgraphs; each of the selected subgraphs has different selections of elements.

16 Claims, 11 Drawing Sheets

(56) References Cited

U.S. PATENT DOCUMENTS

2018/0107899 A1* 4/2018 Gorelick .............. G06F 16/51
2018/0218070 A1   8/2018 Sharm et al.
2019/0303433 A1* 10/2019 Brenne ............... G06F 16/287

OTHER PUBLICATIONS

J.S. Finan et al., "Transitive calibration of the AHP verbal scale." European Journal of Operational Research 112. 1999. pp. 367-372.

* cited by examiner

ELEMENTS IN SUBGRAPH

| | TOTAL | UTILITY | CNSTR | CONF | DIVERS |
|---|---|---|---|---|---|
| APOLLO | 2.0 | 0.1 | -3.5 | 3.0 | 2.4 |
| XENA | 4.7 | 3.5 | -5.0 | 5.0 | 2.5 |
| SIRIUS | 1.4 | 4.8 | -5.0 | -0.2 | 2.8 |
| LORAX | 2.9 | 0.3 | -5.0 | 5.0 | 2.4 |
| OMEGA | 0.7 | 2.8 | -5.0 | -0.3 | 2.3 |
| KRYPTONITE | 1.6 | 3.3 | -5.0 | 1.7 | 2.8 |
| TOPCAT | 1.5 | 3.0 | -3.5 | 1.0 | 1.2 |
| MERCURY | 1.1 | -0.1 | -5.0 | 3.4 | 2.3 |
| RIVIERA | 0.9 | 2.1 | 3.5 | -0.5 | 2.3 |
| IRONGATE | -1.6 | 0.1 | -5.0 | -.09 | 2.2 |
| MANGO | 3.5 | 5.0 | -3.1 | 2.3 | 1.4 |
| SAHARA | 1.5 | 1.4 | -3.8 | 2.3 | 1.2 |
| DEEPWELL | 4.2 | 5.0 | -5.0 | 3.9 | 1.4 |
| BORDEAUX | 0.1 | 1.6 | -5.0 | 3.9 | 1.4 |
| BARCELONA | 1.1 | 1.6 | -5.0 | 2.0 | 2.8 |
| PRELUDE | -0.8 | 1.9 | -5.0 | -0.4 | 1.1 |

FIG. 6B

ELEMENTS NOT IN SUBGRAPH

|  | TOTAL | UTILITY | CNSTR | CONF | DIVERS |
|---|---|---|---|---|---|
| BLADERUNR | -1.7 | 1.3 | -4.6 | -0.3 | -1.9 |
| EDISON | -3.5 | 0.6 | -5.0 | -2.6 | -2.1 |
| PHOENIX | -1.4 | 0.3 | -5.0 | 1.7 | -1.9 |
| NAUTILUS | -0.7 | 1.8 | 3.9 | 0.9 | -2.1 |
| HONEYCMB | -.07 | 0.7 | -4.0 | 1.7 | -2.1 |
| EXCALIBUR | -0.9 | 0.4 | -2.8 | 0.9 | -1.9 |
| KODIAK | -1.0 | 0.7 | -3.6 | 0.9 | -1.9 |
| VOYAGER | -1.1 | -0.0 | -5.0 | 2.0 | -1.9 |
| WOMBAT | -2.4 | -0.6 | -5.0 | -1.8 | -0.9 |
| FLAMINGO | -0.7 | 0.4 | -4.6 | 1.1 | -0.7 |
| JONAH | -1.0 | 1.6 | -5.0 | 1.7 | -1.9 |
| MAD HATTR | -1.7 | 0.2 | -4.3 | 0.3 | -1.9 |
| INDIGO | -1.7 | 0.5 | -4.3 | 0.1 | -1.9 |
| ODYSSEY | -1.3 | -0.1 | -2.3 | 0.3 | -1.9 |

US 11,500,906 B1

CONSTRAINT OPTIMIZATION PROBLEM SOLVING ON SUBFEATURES OF A SUBGRAPH OF A NETWORK WITH CLASSIFICATION OF FEATURES OF VERBAL ELEMENTS IN SUBGRAPHS

TECHNICAL FIELD

The technical field relates in general to the problem of constraint optimization problem solving.

BACKGROUND

A non-trivial multi-objective optimization problem may involve inputting data into a network, for example information presented as 50 columns of data with (probably) inconsistent field names. Classifying the information and bundling the information under appropriate fields/categories involves machine learning. A user does not want to be bothered with the tedium of verbal classification of all of the individual pieces of data into the network.

Thereafter, conventionally, when trying to pick an optimal subgraph of the network, a user manually selects subgraphs on an ad hoc basis to try to achieve a preferred optimization objective.

Traditionally, single objective function optimization, e.g., linear optimization (based on a single column of data) is the standard approach for subgraph choice and analysis. In particular, linear optimization is the conventional solution to the problem of finding the "best" selection of elements to include in a subgraph. However, single objective function optimization, especially linear optimization, suffers severe defects in solving a problem of choosing an optimal subgraph.

For a non-trivial multi-objective optimization problem, no conventional solution exists that simultaneously optimizes each objective. The objective functions are conflicting, and in any event the number of possible solutions as a practical matter approaches infinity.

Combinatorial optimization may be conventionally employed to finding the optimal solution from a finite set of feasible solutions; these problems are familiar to mathematicians as the well-known minimum spanning tree problem and the travelling salesman problem. In computer science today, as a practical matter, these are some of the principal unsolved problems as a consequence of computational complexity and other issues.

SUMMARY

Accordingly, one or more embodiments provide an apparatus, method, and/or computer-readable medium. In an embodiment, there is provided a subgraph storage memory that stores a plurality of subgraphs each populated with data classified into features based on data title, wherein each of the subgraphs has a plurality of elements, wherein each of the elements has a plurality of features with different values; and a processor in communication with the subgraph storage memory. The processor is configured to provide, from the subgraph storage memory, the plurality of subgraphs. For each subfeature of a plurality of subfeatures, the different values assigned to a combination of an element of the elements and one or more features are used by the processor to create a method to evaluate the plurality of subgraphs on the one or more features, as the subfeature which provides what is a knowledge system which provides scoring information about bits of data (scores) in a subgraph. For each metafeature, plural subfeatures among the plurality of subfeatures are selected to be composited into the metafeature; and for each subgraph, the plural subfeatures of each metafeature are composited to provide metafeature scores for each subgraph. The processor is configured to present selected subgraphs from amongst a universe of subgraphs with metafeature scores as context for comparing the selected subgraphs, wherein each of the selected subgraphs has different selections of elements.

In another embodiment, a subfeature takes in a plurality of subgraphs and provides, as a result, subfeature scores for each of the subgraphs, wherein each of the subfeature scores is responsive to a plurality of values of at least one feature in the elements in one of the subgraphs.

In yet another embodiment, a metafeature takes in the plurality of subgraphs which have the subfeatures scores, and provides as a result, the scored metafeatures for each of the subgraphs, wherein each of the scored metafeatures is responsive to a composite of a plurality of the subfeature scores and/or an other scored metafeature of one of the subgraphs.

In still another embodiment, prior to providing the plurality of subgraphs, the universe of subgraphs is prepared, including the plurality of subgraphs which have values which are transformed, wherein each of the subgraphs in the universe of subgraphs is prepared from the elements which have the plurality of features with the different values; the selected subgraphs which are presented as context for comparison are provided from the universe of subgraphs.

An embodiment performs an analysis of an impact of one of the elements on a given subgraph, wherein the impact which is analyzed includes both the impact of elements in the given subgraph and the impact of elements not in the given subgraph.

In a further embodiment, the scored metafeatures are scored against the universe of subgraphs.

Another embodiment, responsive to the metafeatures which result from the compositing of subfeatures, uses the metafeatures which result from the compositing of subfeatures and create pre-determined metafeatures for each subgraph.

In another embodiment, the processor determines the subgraphs in the universe of subgraphs which are most optimized among the universe of subgraphs for a best scored metafeature of at least one of the metafeatures, understanding that "best" according to one utility measurement may not be achievable, for example, might decrease confidence.

Another embodiment can be a method of performing any or all of the above.

Still another embodiment can be a computer readable storage medium comprising instructions for the described method and/or apparatus.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

FIG. 6A and FIG. 6B (collectively, FIG. 6) illustrate elements in or not in a particular subgraph and the metafeature scores for each element;

DETAILED DESCRIPTION

I. Overview

Figure 1:
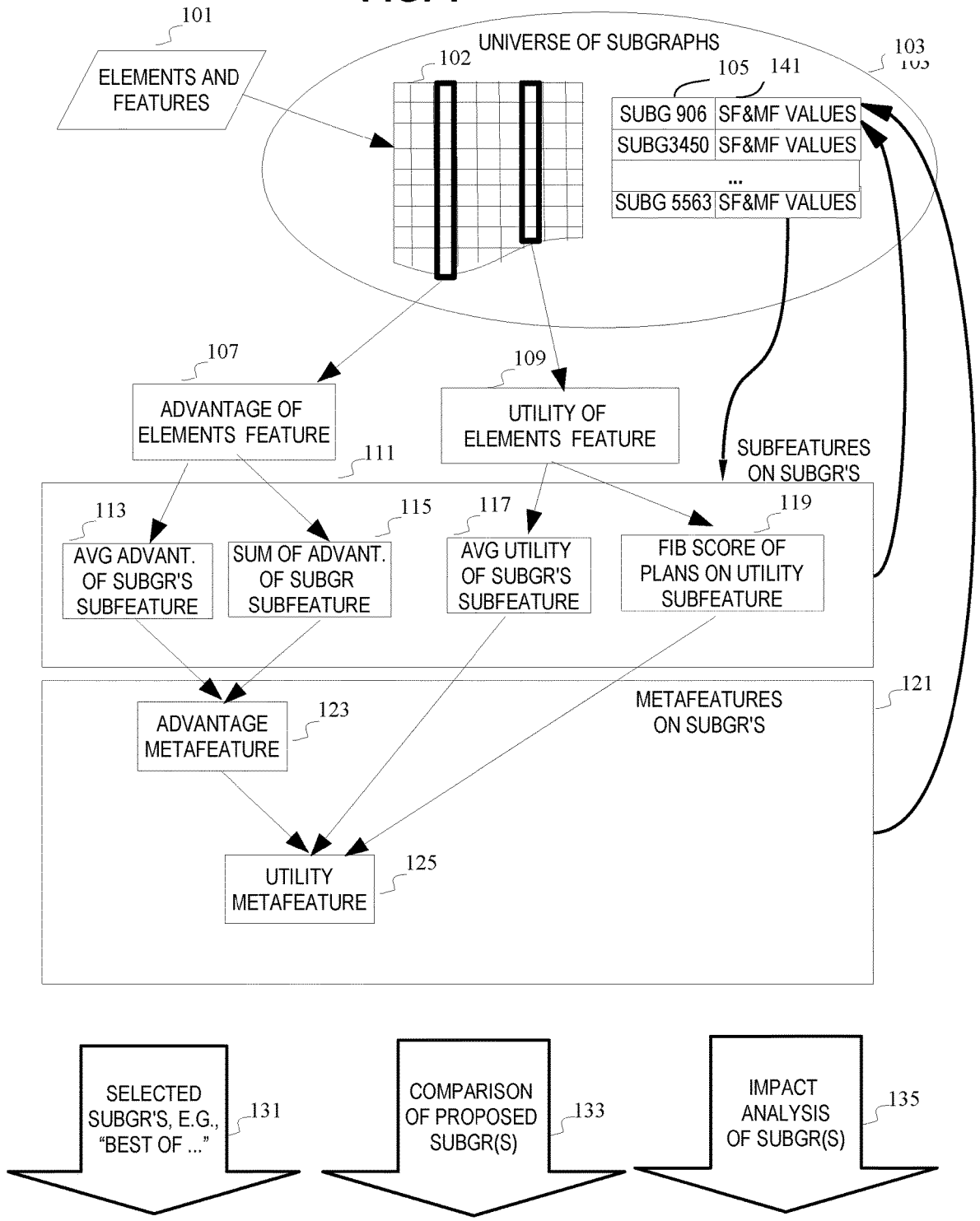
FIG. 1 is a block diagram illustrating an overall concept for subgraph analysis with context provided by compositing subfeatures of a subgraph based on transformed information regarding features of elements in the subgraph.

In overview, the present disclosure concerns computers and computer systems or the like having a capability of classifying the information and bundling the information under appropriate fields/categories, for example involving machine learning, whereby a user can avoid the tedium of verbal classification of all of the individual pieces of data into the network. Such a system may support thereafter analysis of properties of different subgraphs utilizing the machine learned and/or textually inspected classifications of pieces of data, and different combinations of elements which may be incorporated into different subgraphs, and determining various optimizations based on different combinations of subgraphs and the effects of the combinations on measurements of overall subgraph effectiveness with regard to different aspects of subgraphs. Such computers and computer systems may further provide services such as interacting with users, and/or evaluating different subgraphs in the context of the universe of subgraphs, possibly limited to those subgraphs which might be reasonable, in which each of the subgraphs includes different combinations of elements, and each element includes mostly the same features (e.g., fields) as other elements but has different values for the features than other elements have. More particularly, various inventive concepts and principles are embodied in systems, devices, and methods therein related to analyzing subgraphs in context provided by compositing subfeatures of a subgraph into metafeatures based on transformed information regarding features of elements in the subgraph, and the metafeatures of subgraphs can be scored and the context of metafeatures and candidate subgraphs can be provided by a finite universe of possible subgraphs which are generated and populated with data from elements which each have features, and the metafeatures can be standardized groupings of features. Moreover, in the solution philosophy, different goals which have influenced the solution, and other options, can be grasped along with the tradeoffs and/or other reasonable candidate subgraphs in context of what is possible.

Instead of manually defining metafeatures and the subfeatures they need, this system utilizes machine learning and textual inspection to come up with approximations. By analyzing the name a feature has and the data in the feature column, we can use a machine learning technique to pre-categorize columns of data, and to decide upon the subfeatures that should be used to adequately measure that feature.

As further discussed herein below, various inventive principles and combinations thereof are advantageously employed to provide a new apparatus, method, and/or system for solving the problem of finding optimal subgraphs from a graph or subgraph based upon multiple factors, utilizing machine learning to identify the features and subfeatures to measure the feature, and providing understandable context for analysis of the subgraphs in comparison to the universe of possible subgraphs.

Further in accordance with exemplary embodiments, a system and method can generate metafeature scores of candidate subgraphs selected from among the universe of subgraphs, where the metafeature scores are constructed from measurements of information regarding elements which may (or may not) be included in a particular subgraph, in comparison to the universe of subgraphs. The universe of subgraphs is generated from data which is ordinarily collected, such as advantage(s), constraints, and the like, so as to provide a user friendly analysis, which moreover is unlikely to require intensive data gathering at the outset.

II. Observations of Defects in Traditional Approach, and Aspects of Our Approach We start by showing the defects of the traditional approach, we then create our new apparatus and show how it effectively addresses the shortcomings of the standard approach.

There are problems with the current approaches to single objective function optimization. Linear optimization especially suffers severe defects in solving the actual problem of choosing a subgraph.

1. Introduction

Given a collection of elements, which should we pursue and which should we avoid? We use the term "subgraph" to describe the selection of a collection of elements. This is a problem we address: choosing a subset of elements and by process of elimination, which elements are not chosen.

There is a standard approach to this problem, that we describe in Section 1.2, which we call the Linear Optimization Approach, involving linear optimization techniques. The Linear Optimization Approach has the strengths, which we outline in Section 1.3. That approach also has several weaknesses, which are discussed in Section 1.4. Even if we expand our horizon to include general single objective function optimization, there are still significant weaknesses which we weave in the discussion of Section 1.4.

Our approach to the problem of selecting which elements to do, borrows some of the setup from the standard approach, but applies novel algorithms for calculating the "goodness" of a subgraph, as well as keeping track of the alternate subgraphs that could be pursued (which are good in some other sense).

1.1 Context and Problem Statements

The context of our problem is we have a collection of elements (which we also call alternatives in this paper) and we want to choose a subset of those elements to "Choose", i.e. we choose to do those elements. We call this choice of elements a subgraph. Our goal is to find the best subgraph to pursue.

In order to know what constitutes a good subgraph, we need measurements of some kind. It would be ideal if we had measurements for each collection of elements, but that is too much data to ask for. If we have 30 elements, there are $$2^{30}=1,073,741,824$$

different subgraphs possible. In other words, with only 30 elements, it is impossible to directly ask for the scores of all possible subgraphs.

Instead, the standard approach is to measure each element in some fashion and then use the measurements of the chosen elements to arrive at a measurement for the subgraph. That leads us to our first assumption.

Assumption 1. Every element has measurements relative to certain features. A feature is a way of measuring an element, e.g. Advantage(s) could be a feature, or Constraint.

Note 1. Some elements may not be measured on all features. For instance some elements may not have an Advantage score, other elements may not have a Confidence score.

In addition to measurements of the elements, we also need some method of constraining how many elements we can choose. Typically this is done by setting one or more constraint features to measure the elements on and limiting the amount of a constraint. This leads to our second assumption.

Assumption 2. There is one or more feature measurements of the elements that we use to constrain the amount of elements in our subgraph, and a total constraint level for each of those features.

Note 2. As described above, essentially we are summing up, for the chosen elements, the scores on the given constraining features. We could use other methods of totaling up those scores, e.g. averaging or calculating Advantage with Confidence, etc.

Given Assumptions 1 and 2, we can now informally state our problem.

Problem 1 (Informal Version of Main Problem). Given a collection of elements, features scores for those elements, constraining features, and perhaps other logical constraints create a subgraph that:

1. best meets our current and/or future needs . . .
2. we can communicate why it is the best subgraph . . .
3. we can compare it to other subgraphs and explain why the trade-off between the two makes our subgraph the best.

By logical constraint we mean constraints like e.g. Node A in the subgraph requires Node B in the subgraph.

Note 3. The way we determine the "best" subgraph is by using the element scores of the chosen elements to determine a score for the subgraph. We discuss this concept more in Section 2.3, but it is a key point. Namely, that we go from information about elements to information about subgraphs. There are many possible ways to do this, depending upon the needs of the situation (see Section 2.3 for more information about these methods).

1.2 Standard Approach

Given Problem 1, the industry standard method of solving the problem would be to translate it into a linear optimization problem and use those techniques to solve it. The subtlety is in how you translate Problem 1 into linear optimization terms. Table 1 contains those steps.

Note that we converted individual scores on the elements into a single score and then maximize the sum of those scores for the chosen elements. By doing this we lose track of the make up of the elements involved (e.g. they could all be low confidence, or low advantage). In addition this assumes that the benefit of an element is always the same, namely no matter what other elements are chosen. Using a sports analogy this says that having two great quarterbacks is twice the benefit of having a single great quarterback, clearly a false hypothesis.

Table 1: Standard approach to Problem 1

1. Combine the feature scores for an element into a single overall score for that element. For the $i^{th}$ element we call $s_i$ its overall score.

2. Define the objective function that is $$F = s_1 \cdot x_1 + s_2 \cdot x_2 \ldots s_n \cdot x_n$$

where $x_i$ is an indicator variable, it is 0 if the $i^{th}$ element is not chosen and 1 if it is.

3. Maximize F subject to features which are constraining the system.

1.3 Strengths of the Standard Approach

The main strengths of this approach is that linear optimization on discrete variables is a well understood field of mathematics. There are algorithms that have been developed over decades that solve this problem very well. In particular integer programming techniques can solve this problem exactly and for sufficiently small problems, integer programming is fast. Integer programming typically uses the simplex method and the branch and bound algorithm, along with some very well researched linear algebra techniques.

Because linear programming is so well understood, it is a natural approach to start with the analysis of the problem. However it has severe weaknesses which we now explore.

1.4 Weaknesses of the Standard Approach

There are four main weaknesses of the standard approach:

1. Assuming the translation into linear optimization found in Table 1 is 100% correct (a faulty assumption), integer programming is far too slow to handle the optimization problems our clients require. For instance, any model with over 50 alternatives takes hours to solve, and the solution time grows exponentially in the number of alternatives. (We can avert this crisis by using genetic algorithms to find excellent approximate solutions. However, genetic algorithms do not address the other issues with this approach.)

2. The translation into linear optimization assumes that the benefit of an element is independent of the other elements in a subgraph. The quarterback analogy of Section 1.2 shows why this assumption is faulty.

3. Optimizing on a single score, especially in a linear fashion, loses the makeup of the elements that are being chosen. To abuse the sporting example, if we have a team that is weak on quarterbacks, linear optimization will tell us our first 10 draft picks should be quarterbacks, even though we only need one. (Of course we could put in a constraint that says we only want to draft one quarterback. However that is only sidestepping the issue. Optimizing on the single score is assuming that a player gives any team he or she is on the same benefit always.)

4. In most real world settings there not some single score we wish to optimize upon at all. Rather, we wish to show the strengths of a subgraph in various dimensions. E.g. this subgraph has relatively low total constraint, gives a lot of advantage but has low confidence. By combining all of the scores into a single metric, we are adding up apples, oranges, mosquitoes, boats, etc., and getting single score that makes very little sense to anyone involved.

1.5 Terminology

In order to cogently present our ideas, we require some terminology that has yet to be standardized, as this field of inquiry is very new.

Definition 1 (Node). A Node is a discrete item that we are choosing to 'do' or 'not do'.

Definition 2 (Feature). A feature is a column of scores on a set of elements.

These scores could be categorical (e.g. Hi/Med/Lo) or numerical. If F is a feature, we write F for the score of the $i^{th}$ element on the feature F.

Definition 3 (Subnetwork). A subnetwork is the information of a set of elements and a collection of features measuring those elements. In addition the subnetwork can include information about which features are constraining the system and the allowed total constraint amount, as well as logical constraints.

Note 4. Essentially a subnetwork is the inputs for our problem.

Definition 4 (Subgraph). A subgraph is the choice of what elements to 'do'. A subgraph could also include information about when to start the element, spending breakdowns, etc. However, for the purposes of this paper we only care about whether or not an element is 'in the subgraph'. We use the notation "in the subgraph", "chosen", and "the element is on" interchangeably to mean that the element is a part of this subgraph.

Note 5. Given a subgraph P we define $P_i$ to be the indicator variable for the $i^{th}$ element, where $P_i=0, 1$ where 0 means that the $i^{th}$ element is not in the subgraph and 1 means it is.

Definition 5 (Subfeature (informal definition)). A subfeature is a function whose inputs are a feature in a subnetwork and a subgraph, and whose output is a real number score for that subgraph on that feature.

Note 6. In Table 1 the objective function F is a subfeature on the overall score feature. We call this the subnetwork score subfeature. See Section 2.3 for more information of the subnetwork subfeature.

Note 7. We call these subfeatures because a feature in a subnetwork could have many different subfeatures associated with it. For instance the subfeature that averages the scores of the chosen alternatives and the Fibonacci subfeature could both be used on a single feature in a subnetwork.

Definition 6 (Subfeature (formal definition)). Let P be a subnetwork, let T be the set of all features of that subnetwork and let Subgraphs$_P$ be the set of all possible subgraphs of the subnetwork P. Then a subfeature S is a mapping S: F×Subgraphs$_P$→R (where R is the set of real numbers). Typically we fix the feature F∈T and write SF: Subgraphs$_P$→R (where R is the set of real numbers).

Note 8. It is not required that a subfeature only use a single feature. For the purposes of exposition we use that as our definition. However a subfeature could take into account several features, and we would still use the name 'subfeature' for that. For instance the standard diversity subfeature in Definition 14 (below) requires two features for its definition. As another example, if we combined the confidence feature and the advantage feature together to get a single score for the amount of advantage with confidence in subgraph, we would still call that a subfeature. All of the mathematics defined after this point still works, however the definition is more cumbersome to write in this general form.

Definition 7 (Metafeature). A metafeature is function that combines a set of subfeatures (and/or other metafeatures) into a single score. For example, we could average 2 selections of subfeatures to create 2 metafeatures MF1 and MF2, and we could then create a metafeature MF3 that is the maximum of the metafeatures MF1 and MF2 on each subgraph.

With these definitions we can now more rigorously restate Problem 1.

Problem 2 (Main Problem). Given a subnetwork P:
1. Find subgraphs that do well on a given metafeature.
2. Compare and contrast subgraphs that do well on different metafeatures.

Note 9. Our goal is not simply to maximize any one thing. Rather it is to find subgraphs that do well on a variety of different metafeatures and then compare and contrast them so that our users can decide upon which trade-offs are the best to make.

2 Our Approach

Our method of solving Problem 2 involves several pieces. We need subfeatures that best encapsulate how benefits accrue on our features. Simple summation is not always the best, as the quarterback example shows. In addition we need a way to combine subfeatures into metafeatures that are meaningful and comprehensible to our users. Lastly we need to normalize our scores on subfeatures and metafeatures so that the scores are immediately comprehensible.

This section is organized as follows:

Section 2.1: We begin by providing an overview of how our algorithm works, and the key steps involved in it.

Section 2.2: Next we discuss how our approach alleviates the problems with the standard approach discussed in Section 1.4.

Section 2.3 We have the standard summing of the feature scores for alternatives in the subgraph; however, that scoring leads to many issues. We require new subfeatures, which we define in Section 2.3.

Section 2.4: Once we have subfeature scores we need a mechanism to normalize those scores so that they are comparable. We define several normalization methods in these sections.

Section 2.5: Once we have normalized subfeature scores, we need a method of grouping subfeatures together to create metafeatures. In addition, given a feature, we need a method to determine which kind of subfeatures should be used to measure how good a subgraph is on that feature.

Section 2.6: Once we know that a metafeature is going to be made up of certain subfeatures, we require some method to combine those scores. We cover several methods of doing so in this section.

Section 2.7: Several of our methods of subfeature normalization require knowledge of all possible subgraph scores. This is a technically infeasible problem, so we discuss various ways of generating universes (i.e. representative subsets of all possible subgraphs) that we can use as approximations of the set of all possible subgraphs.

Section 2.8: We close out our discussion by focusing on the problem of verbal scales. There are several approaches we take to adapting verbal features to our problem which we discuss here.

2.1 Algorithm Overview

Our method of solving Problem 2 breaks down into the following steps.

1. Creating a universe of subgraphs, or simply a universe (see Section 2.7 for details). This universe of subgraphs is used for two different purposes. First our subgraphs that are best on some metafeature are chosen from this universe. Second, our normalization of subfeature scores makes use of this universe. In a very real sense, universe generation is the key computational step of our process.

2. Defining the subfeatures that will be used in our metafeatures and scoring all subgraphs in a universe on these subfeatures. See Section 2.3 for the standard subfeatures we use.

3. Defining the metafeatures that we use to evaluate the subgraphs in our universe, to find the best subgraphs on those metafeatures. See Sections 2.5 and 2.6 for details around this process.

2.2 Addressing Weaknesses of the Standard Approach

In Section 1.4 we enumerated 4 main weaknesses that the standard approach to Problem 1. Let us see how our approach avoids those issues, one at a time.

1. Our approach does not rely upon integer programming in any fashion, and thus is not subject to the speed issues found therein. Our main speed related problem is that of universe generation (i.e generating a universe of subgraphs), discussed in Section 2.7, and there are many ways to generate a useful universe without incurring undue speed limitations (e.g. we can handle subnetworks with thousands of alternatives in a seconds, and in addition our methods allow for parallel GPU generation of universes speeding up the calculation by a factor of 100-1000.)

2. Our method of allowing for many different types of subfeatures allows the benefit of an element to be dependent upon the subnetwork it is within, avoiding this issue entirely.

3. Our approach is not optimizing on a single score, but rather searching for subgraphs that do well on various metafeatures, allowing us to naturally see the breakdown of the elements. In addition we can define metafeatures that combine scores together in new fashions to get more insightful scores. For instance, we could have a quarterback metafeature, a wide receiver metafeature, a running back metafeature and offensive line metafeature, which we combine together to give us a 'passing offense' metafeature to see exactly how well our players combine on this combined attribute, and then find teams (i.e. subgraphs) that are very good on that metafeature.

4. Lastly, our approach allows us to find subgraphs that do well in a variety of different fashions. In addition our normalization of scores allows us to compare how well subgraphs perform on those measures directly. Again we avoid the standard approaches problem entirely by the definition of our structures.

2.3 Subfeatures

The basic building block for evaluating subgraphs is that of a subfeature as defined in Definition 6. A subfeature is a way of combining element feature information into a score for a subgraph. We have several standard methods which already exist mathematically in other contexts, but are novel in this context.

Definition 8 (Subnetwork subfeature:). Given a feature F of a subnetwork P we define the subnetwork subfeature of F, denoted by $Port_F$, as:

$Port_F(P) = \Sigma F_i \cdot P_i$

Definition 9 (Subnetwork of top subfeature:). This is similar to the subnetwork subfeature, except we only score for top percentage of performing elements on this subnetwork. If F is the feature and p is the percent cut-off we are using, if we define a new feature $F^p$ by $(F^p)_i = F$ if the $i^{th}$ is in the top p percent of elements on the feature F and 0 otherwise, then the subnetwork of top subfeature is simply the subnetwork subfeature of F.

Definition 10 (Mean subfeature:). Given a feature F of a subnetwork P the mean subfeature of F on a subgraph P is denoted by $Mean_F(P)$ and is defined to be the mean of the F scores of the elements in subgraph P.

Definition 11 (Power rank subfeature:). Given a feature F of a subnetwork P the power rank subfeature with base b is defined as follows. Let $R_F(i)$ be the F ranking of the $i^{th}$ element (i.e. we rank the elements from best to worst based on their scores on the feature F with the best having a value of 1 and the worst having a value of N=the number of elements in the subnetwork). Then the power rank subfeature on F with base b is given by:

$Pow_{F,b}(P) = \Sigma P_i \cdot b^{R_F(i)}$

Definition 12 (Fibonacci subfeature). The Fibonacci subfeature of a feature F is defined as follows. For a subgraph P does it:
 contain the best element on feature F?
 contain 1 of the best 2 elements on that feature?
 contain 2 of the best 3?
 contain 3 of the best 5?
 contain 5 of the best 8?
 . . .
 Up to the number of elements in the subnetwork.

Let N be the number of questions asked above, and lets be the number of times we answered yes to the previous questions, then the Fibonacci subfeature base b on the feature F evaluated on the subgraph P is:

$$Fib_{F,b}(P) = \frac{1 - b^s}{1 - b^N}$$

Definition 13 (Maximum score subfeature). Given a feature F this subfeature evaluated on a subgraph P simply returns the maximum F score of the elements in P.

Definition 14 (Standard diversity subfeature). This subfeature differs from the previous ones in that it uses two features: a categorical feature (i.e. a feature with a discrete set of possible values) and a numeric feature. If we let C be the categorical feature and F be the numeric feature the diversity subfeature calculates the F sum of the alternatives in a subgraph at each level of the categorical feature. We then compare that breakdown to an ideal and use that to arrive at a score about how diverse our subgraph is on the categorical feature C relative to the numeric feature F.

Note 10. In the standard linear optimization approach, the subnetwork subfeature is the only method for evaluating how good a subgraph is relative to a feature. All of the additional subfeatures (expect power rank) defined in this section make the impact of an element on a subgraph to be dependent upon what else is in the subgraph. However the power rank subfeature allows us to better emphasize the ranking, as opposed to the raw score.

2.4 Normalization of Subfeatures

By normalization of subfeatures we mean converting our subfeature scores all to the same range of possible outputs so that they are all commensurate. We standardize on a 0-1 scale for purposes of exposition, but clearly other scales could be used as well (e.g. −1 to 1 or 1-10, etc.).

There are several methods we can use to standardize all scores to a 0-1 scale, where 0 means the absolute worst and 1 means perfection, including the following examples.

1. If we have a known target value for the subfeature we could use that target value to normalize the column. For instance anything that hits the target or goes above gets a 1 and for anything less than the target we divide by the target. Another example would be to divide the score by 2 times the target value and truncate anything higher than 1, effectively giving a subgraph that hits the target a score of 0:5 and anything that is 2 times the target or above a perfect score of 1.

2. If we have constructed a universe as in Section 2.7 we could calculate the percentile score of our subgraph relative to the score of the subgraphs in the universe.

3. Or, if we have a universe, we could calculate the z-score of our subgraph relative to the universe. We could truncate those scores at a maximum and minimum level and then use linear interpolation to get our score between 0 and 1.

There are many other methods we could use to normalize. For our current implementation we favor the percentile scoring versus the universe because of the statistical properties of that calculation and its simplicity.

2.5 Defining Metafeatures

Now that we have defined several useful subfeatures in Section 2.3, and constructed several ways of normalizing those scores, we need a method of defining metafeatures. A metafeature is the information of the subfeatures we are combining and a function to use to combine them. We discuss methods of combining subfeatures in Section 2.6.

The first question is, which subfeatures from which features will we use to create a given metafeature. In order to do this we require knowledge of what the features of the subnetwork mean, and how they are used. For instance an Advantage feature is measured by simply summing up the advantage values, i.e. using the subnetwork subfeature. However, something like Diversity requires a different subfeature, and abstract measurements like a Confidence feature that scores between 1 (lowest confidence) and 4 (highest confidence) may require a combination of average, subnetwork, and Fibonacci subfeatures to adequately measure it. An expert could manually define metafeatures and the subfeatures they need. Instead, we can use machine learning and textual inspection to come up with useful approximations. By analyzing the name a feature has and the data in the feature column, we can use a machine learning algorithm to decide upon the subfeatures that should be used to adequately measure that feature.

The next question is, how should we group these features to give an insightful metafeature. We can solve this by defining the following standard, pre-defined metafeatures:

Utility: This metafeature is made up from all features that tell us about utility (or benefits).
Constraint: This metafeature is made up from all features that tells us about the constraint amount of the elements.
Confidence: This metafeature is made up from all features that tells us about the confidence involved.
Diversity: This metafeature is made up from all features that tells us about the diversity of a subgraph.
Overall: This metafeature is a combination of all of the other standard metafeatures.

This list should not be considered exhaustive, it is merely one standard appropriate for use. It could be changed to meet specific industry needs with very little effort. In operation, users can categorize their columns as one of the first four metafeatures, and we use machine learning techniques similar to those for determining the subfeatures to use on a feature, to pre-categorize columns.

2.6 Composition of Features

Once we know the subfeatures that make up a metafeature we can combine the subfeatures, for example by simply averaging the scores. This may have an advantage of behaving like a GPA so the calculation meets users' expectations. That is, if a subgraph scores a 0.8 on subfeature SF1 and 1.0 on subfeature SF2 and metafeature MF1 is made up of those subfeatures, it makes common sense to users that the MF1 score should be 0.9.

There are, of course other methods to compose subfeatures into a metafeature. We could take the maximum or minimum of the scores, some of which include the following. We could use Minkowskii metrics to combine the subfeature scores, or if we have targets we use, for example, the kNN machine learning algorithm to combine the scores. Other methods are possible and will be readily grasped considering these examples.

2.7 Universe Generation

Universe generation (i.e. generating a universe of subgraphs) may be a key component for finding subgraphs that do well on metafeatures as well as normalizing subfeature scores. The simplest method of universe generation is simply randomly generating subgraphs, subject to varying constraints. This simple method has proven quite adequate in many simulated circumstances.

However, randomly generating subgraphs can take a significant amount of time to find subgraphs that do well on particular metafeatures. When that happens we can fall back to machine learning approaches to pseudo-optimize on those metafeatures to quickly find subgraphs that do well on a given metafeature, and use those answers to partially populate our universe. In addition we could make use of quick linear optimization approximations to the metafeature scoring and a bang for buck calculation (VROI) to quickly find subgraphs that do well on a given metafeature. There are many standard tactics that can be applied to add subgraphs to our universes that do well on any given metafeature without incurring undue computational overhead. In addition shallow depth genetic algorithms could be applied to quickly find subgraphs that do well on a metafeature, without incurring significant computational overhead. These and other variations and evolutions will be appreciated as being appropriate for generating a universe of subgraphs based on input data regarding elements and features In our context, the measurements have inherent uncertainty and thus finding the mathematically perfect optimal subgraph on a particular metafeature is not that useful, because the uncertainty may make that subgraph actually subpar. Instead we need to quickly find subgraphs that are 'good' on a metafeature and this problem is much more computationally tractable.

2.8 Handling Verbal Scales

In real world applications, we may get data that is not numeric, but rather verbal, e.g. High/Medium/Low. The simplest way to handle such data is to convert it to a numerical scale and apply the previously discussed algorithms for scoring. However, if more subtlety is desired, we can leave the values as verbal and apply, for example, balance types of scoring to those, comparing the balance to the ideal which would be having as many as possible in the highest categories. Either approach is a valid mechanism of handling verbal scales within the confines of our apparatus.

3 A Note on Smaller is Better Features

Most of the previous discussion has implicitly assumed that our features are "higher is better," e.g. Advantage or "Confidence." However some features may be "smaller is better," e.g. Constraint and Diversity. Those can easily be inverted to give equivalent features where higher is better. One approach we use is to do $$1 - \text{subfeature normalized score}$$

for features where smaller is better. This works out well conceptually since the normalized scores are on a 0-1 scale, thus so is 1 minus them. And performing 1−normalized score inverts them to make it a higher is better system.

We can use machine learning techniques similar to those mentioned in Section 2.5 to automatically figure out whether a column (e.g., a field in the data) is a 'higher is better' column.

4 A Note on Metafeature Letter Grades

Throughout this document we have discussed metafeature grades on a normalized scale, typically 0-1. Those, of course, can be thought of as grades. However, we can easily make those values actual letter grades, in the same way any teacher takes students' scores and converts them into letter grades for report cards, i.e. defining a lowest range of the 0-1 scores to be an F, and so on.

Converting those scores to an A-F scale can help users quickly digest the information of multiple subgraphs. Also the A-F scale is so universally understood that the user does not need to think about how to interpret scores. For instance, if we stick with the 0-1 scale, users would naturally be confused on 'lower is better' features: is a 1 great or horrible? By standardizing on an A-F reporting system users do not face this issue.

III. Example Implementations

Figure 8:
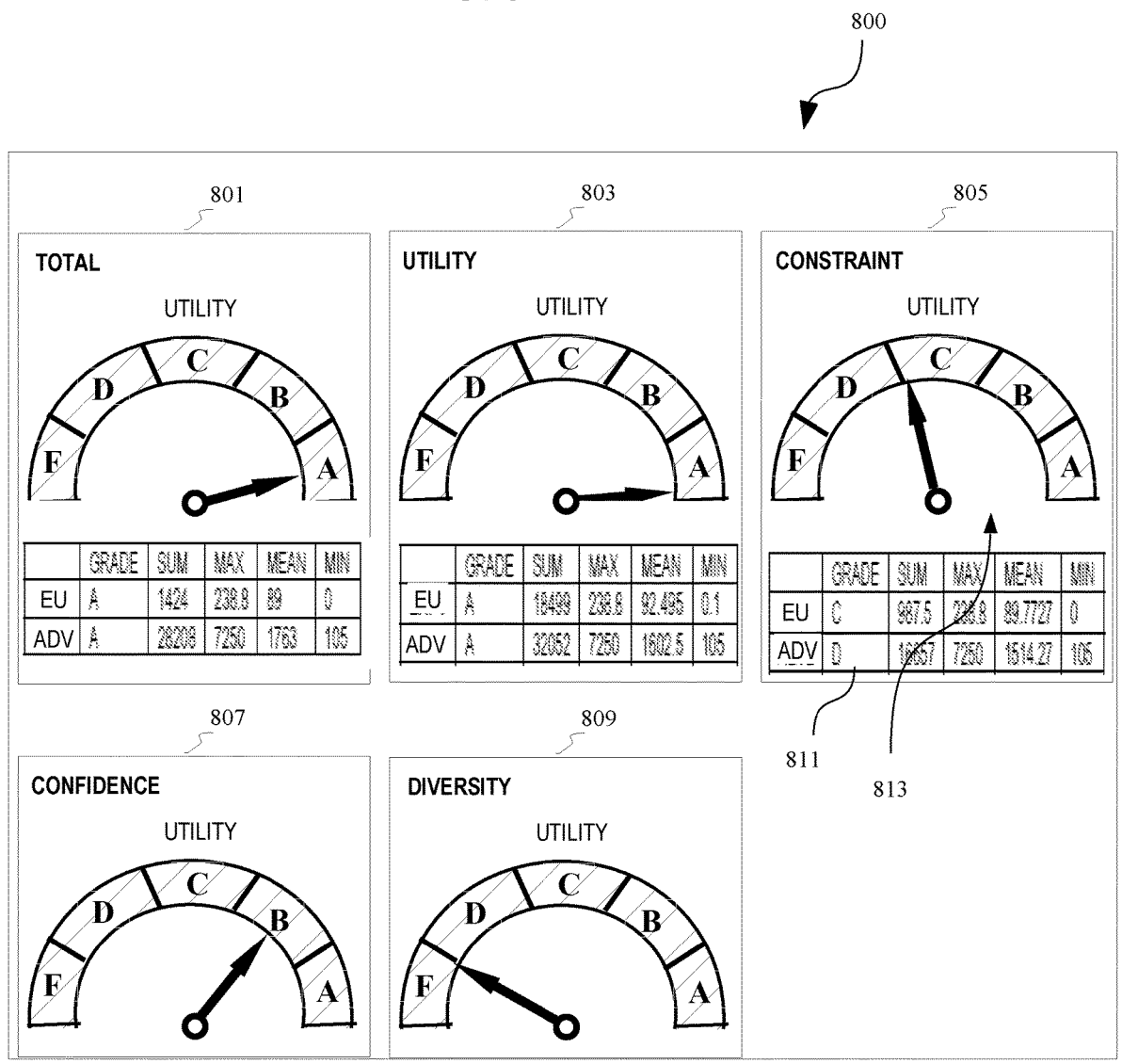
FIG. 8 is an example user interface illustrating a detailed analysis of a metafeature for different selected subgraphs.
Figure 9:
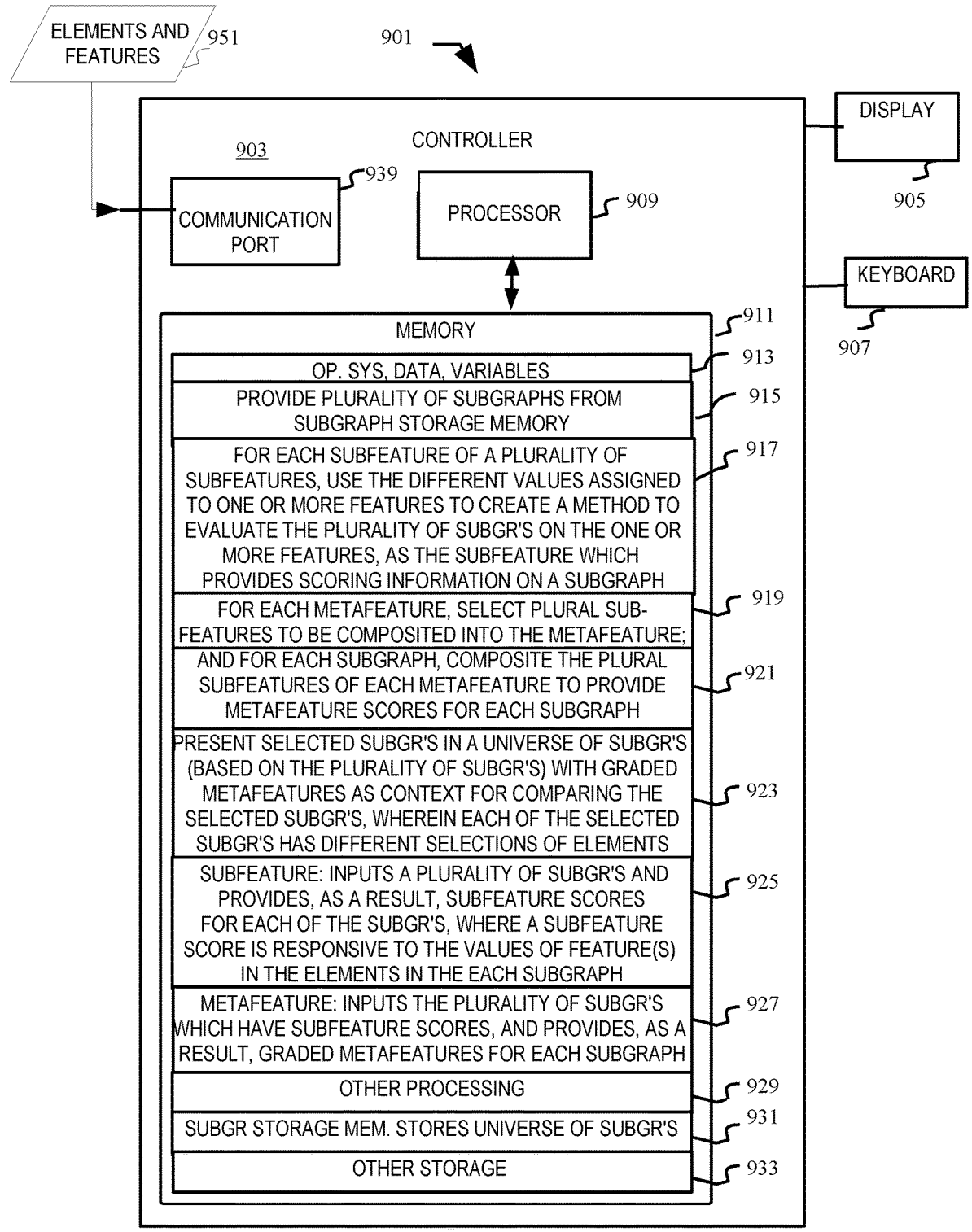
FIG. 9 is a block diagram illustrating portions of an exemplary computer.
Figure 10:
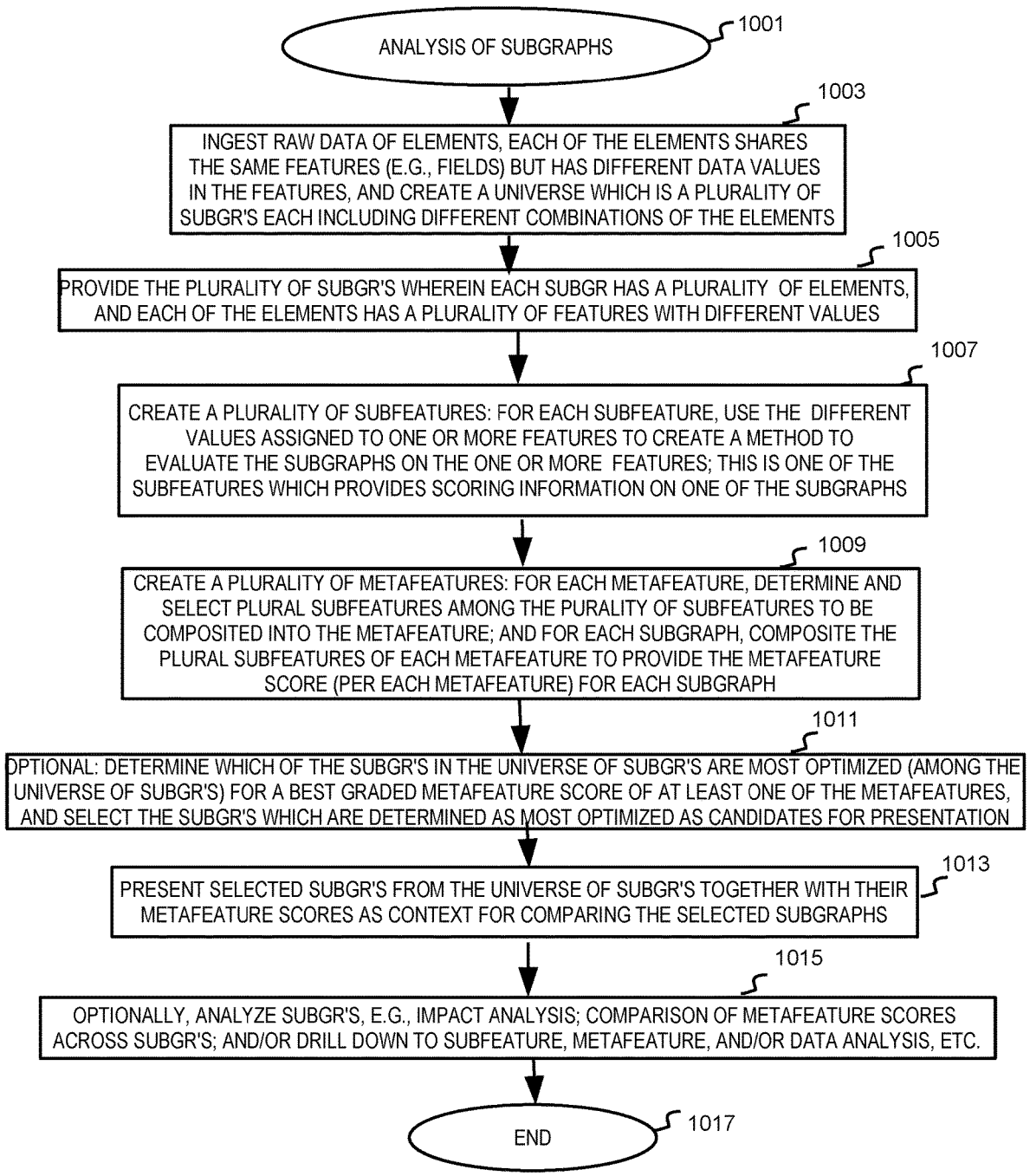
FIG. 10 is a flow chart illustrating a procedure for subgraph analysis with context provided by compositing subfeatures of a subgraph based on transformed information regarding features of elements in the subgraph.

This section will discuss concrete examples of implementation. FIG. 1 illustrates an overall concept. FIG. 2 to FIG. 8 illustrate example user interfaces or aspects thereof. FIG. 9 illustrates a computer implementation. FIG. 10 illustrates a procedure for analysis of subgraphs with context provided by compositing subfeatures of a subgraph based on transformed information regarding features of elements in the subgraph, which conveniently may be implemented on the computer of FIG. 9, or any another apparatus which is appropriately configured.

The concept is to figure out what the best options are from various perspectives, along with making the system simpler to get started without needing training in complicated concepts such as pairwise comparison used based on analytic network processes.

Frequently users have raw data, such as constraints, advantage estimated, and categorical information for elements, where an "element" in some implementations might be sometimes referred to as an individual node, vertices or point in the subgraph. An example of elements is provided in Table 1, which could be a spreadsheet. It should be understood that Table 1 is partial, and is representative of a wide variety of elements (across the rows Table 1) and features (the second and subsequent columns of Table) for each element. Note that each feature (in Table 1, a column) is a field which has a name (sometimes referred to herein as a "data title"), in this example the field names include "Innovation Type," "Region," "Utility", "Advantage," "Constraint," and "Probability of Success;" other raw data may have other fields and other field names. For each element, each feature contains a value; such as the element named "Apollo" has a value of 0.10 for the feature named "Utility". In some examples, it is possible that some values are unassigned.

TABLE 1

Elements and Features

| Element name | Innovation Type | Region | Utility | Advantage | Constraint | Probability of success |
|---|---|---|---|---|---|---|
| Apollo | Substantial | LATAM | 0.10 | 500.00 | 160,000.00 | 0.66 |
| Bladerunnr | Substantial | LATAM | 97.90 | 1,200.00 | 300,000.00 | 0.40 |
| Edison | Substantial | LATAM | 0.50 | 1,750.00 | 450,00.00 | 0.21 |
| Xena | Core | NAM | 206.70 | 105.00 | 290,000.00 | 0.93 |
| Sirius | Incremental | LATAM | 238.80 | 1,060.00 | 290,000.00 | 0.39 |
| Phoenix | Substantial | LATAM | 0.00 | 1,350.00 | 430,000.00 | 0.60 |
| Nautilus | Transform. | NAM | 179.50 | 900.00 | 250,000.00 | 0.53 |
| Lorax | Substantial | LATAM | 5.10 | 650.00 | 210,000.00 | 0.79 |
| Omega | Substantial | NAM | 154.60 | 925.00 | 230,000.00 | 0.37 |
| Kryptonite | Incremental | LATAM | 124.50 | 2,350.00 | 320,000.00 | 0.58 |
| Honeycomb | Transform. | NAM | 0.70 | 2,000.00 | 260,000.00 | 0.60 |
| Excalibur | Substantial | EU | 42.40 | 275.00 | 180,000.00 | 0.53 |
| Topcat | Transform. | NAM | 0.70 | 2,000.00 | 160,000.00 | 0.53 |
| Kodiak | Core | LATAM | 90.90 | 107.00 | 230,000.00 | 0.53 |
| Mercury | Core | APAC | 0.00 | 113.00 | 290,000.00 | 0.68 |
| Riviera | Core | NAM | 153.40 | 185.00 | 160,000.00 | 0.35 |
| Voyager | Substantial | APAC | 11.30 | 200.00 | 330,000.00 | 0.61 |
| Wombat | Incremental | EU | 25.60 | 975.00 | 350,000.00 | 0.54 |
| Jonah | Substantial | EU | 156.00 | 575.00 | 450,000.00 | 0.60 |
| Irongate | Core | APAC | 6.30 | 330.00 | 350,000.00 | 0.28 |

Each element (in Table 1, a row) optionally has a name (in Table 1, under "Element Name"), each element has features (in Table 1, fields shown as a column after the "Element Name" column), and each element has a value per feature (although some of the values might be missing). This data can be imported, such as from the spreadsheet a representative example of which is provided in Table 1.

Reference is made to FIG. 1, a block diagram illustrating an overall concept for subgraph analysis with context provided by compositing subfeatures of a subgraph based on transformed information regarding features of elements in the subgraph. FIG. 1 illustrates a subnetwork of all elements, here represented by a collection of data (which could be one or more documents and/or a data stream for example) which is elements and features 101; the subnetwork will be provided as input and is stored as a stored subset 102 in a universe of subgraphs 103. Also illustrated in FIG. 1 in the universe of subgraphs is a plurality of subgraphs 105 (here a simplified representation of three subgraphs which is representative of the plurality of subgraphs), and the calculated subfeature and metafeature (SF&MF) values 141 for each subgraph. Each subgraph of the plurality of subgraphs 105 indicates several of the elements (e.g., particular rows in the stored subset 102) which are in that particular subgraph; the other elements are not in that particular subgraph. Features are here represented by an advantage of elements feature 107 and a utility of elements feature 109. A particular subgraph will include the values for all of the features (e.g., columns); the subfeature and metafeature values 141 are based on the elements in the particular subgraph (among other things) (or in some variations may utilize elements not in the subgraph, e.g., ratio vs. "not chosen elements") and are stored in connection with their particular subgraph. FIG. 1 also illustrates subfeatures 111 on the subgraphs, which in this example include average advantage of subgraphs subfeature 113, sum of advantage of subgraphs subfeature 115, average utility of subgraphs subfeature 117, and Fibonacci score of subgraphs on the Utility subfeature 119. FIG. 1 also illustrate metafeatures 121 on the subgraphs, which in this example include an advantage metafeature 123 and a utility metafeature 125. FIG. 1 also illustrates various additional analyses which may be performed, such as selecting subgraphs for a "best of . . . " analysis 131 with regard to the metafeatures, a comparison of proposed subgraphs 133, and/or an impact analysis of the subgraph (s) 135. These additional analyses are representative and can be based on the universe of subgraphs 103, the subfeatures 111 on subgraphs and the metafeatures 121 on subgraphs. In implementing the universe of subgraphs 103, it is convenient to store the data of the subnetwork as a whole as the stored subset 102, and to generate individual subgraphs by indicating which elements from the subnetwork are in each subgraph (as in plurality of subgraphs 105) and to store other information which is associated with individual subgraphs (such as raw scores, subfeature values, and metafeature values 141), rather than to create copies of the relevant subnetwork data for each of the subgraphs.

As illustrated in FIG. 1, the elements and features 101 data can be ingested to provide a universe of subgraphs 103. The features are "advantage" of elements 107 and "utility" of elements 109, which can be easily determined from a name assigned to the field.

In the universe of subgraphs 103, each of the subgraphs in the universe of a plurality of different elements, and each of the elements has a plurality of features with different values. Different subfeatures are created based on the subgraphs in the universe of subgraphs. The different values assigned to one or more features in the subset 102 are used to create a method to evaluate the subgraphs 105 on these one or more features; this is referred to as a "subfeature" which provides subfeature scoring information for each subgraph. In the example of FIG. 1, the stored subset 102 (which all of the elements, the rows in Table 1) includes two fields which each are a feature (e.g., a column in Table 1).

In the example of FIG. 1, the advantage of elements 107 feature can be averaged (as a subfeature which is an average advantage 113), and can be summed (as a subfeature which is a sum of restraints 115). The Utility 109 feature can be averaged (as a subfeature which is an average Utility 117), and a Fibonacci score can be calculated (as a subfeature which is a Fibonacci score 119). These raw values can be stored per subgraph 141 in the universe of subgraphs 103, for further analysis. The subfeature is a function which inputs the data values (e.g., from the stored subset 102) of the particular feature of the elements which are in one particular subgraph 105 (but not the data values of elements not in the particular subgraph), and which provides its own scoring information; this is done for each subfeature, and for each of the subgraphs 105 in the universe of subgraphs 103. It should be noted that a particular feature (here represented by Advantage and Utility) can give rise to several different ways to measure how "good" the feature is (as will be appreciated by those skilled in subnetwork evaluation), such as Advantage may be evaluated as an average Advantage of elements in a subgraph and as the sum of Advantage of all of the elements in a subgraph. How "good" the scoring information (which results from inputting the subgraphs into the subfeature) is, is relative to other subgraphs in the universe as indicated in FIG. 1 by inputting the raw scores, subfeature and metafeature values 141 into the subfeatures on subgraphs 111 (or possibly relative to a pre-defined target) and other factors discussed elsewhere in this document.

In the example of FIG. 1, two or more subfeatures are composited into a metafeature 123, 125. In this example, the average advantage subfeature 113 and the sum of advantage subfeature 115 are composited into the advantage metafeature 123; and the average utility subfeature 117, the Fibonacci score on the Utility metafeature 119, and the advantage metafeature 123 are composited into the utility metafeature 125. As discussed elsewhere in the document, the scoring information resulting from the subfeatures can be normalized as part of the compositing into the metafeature 123, 125. Inputting the selected subfeatures (for a particular subgraph) into the metafeature will yield a metafeature score particular to the subgraph, for each of the metafeatures. The metafeature scores can be stored 141 per each of the subgraphs 105 in the universe of subgraphs 103 for use in further analysis.

As suggested by the further analyses, best subgraphs 131 can be selected by determining which subgraph in the universe has the best metafeature score for each of the metafeatures, such as a subgraph with the "best" advantage metafeature. An example is discussed in connection with FIG. 4. Another analysis is comparison of proposed subgraph(s) 113 in relation to selected subgraphs from the universe of subgraphs 103, for example, a subgraph to be compared may be manually selected from the universe of subgraphs 103, or created/edited for comparison purposes (e.g., a user's "preferred" combination of elements). Yet another possible analysis is an "impact analysis" 135 which illustrates, for each subgraph, the contribution, for each of the elements, of each of the metafeature scores; this is further discussed in connection with FIG. 6. Other analyses and presentations of the scoring and data underlying the metafeature scores are possible, as suggested by FIG. 5, FIG. 7 and FIG. 8.

With this understanding of the overall concept and a representative concrete example, we informally review some of the definitions provided above in relation to this example, and then we discuss the example of FIG. 1 more concretely.

A "subnetwork" is the inputs, e.g., the elements and features 101, which includes the elements, the features of each of the elements, the values of the features.

A "subgraph" 105 has multiple elements and each of the elements has the same features (but different values of the features). The question is how good that subgraph is.

A "universe" of subgraphs is all of the possible ways (or representative possible ways) to make up a subgraph based on the elements in the subnetwork (the subnetwork being what is input). The universe of subgraphs can be generated in many ways. For example, random subgraphs can be generated; all possible subgraphs can be generated (but this becomes computationally prohibitive since 30 elements results in roughly 1 billion possible subgraphs); subgraphs can be generated by giving importances and generate subgraphs which do well on various measurements; subgraphs can be generated based on neural networking to determine best subgraphs for various measurements; and/or various other ways. In theory, a universe need not be generated, if targets can be generated which the subgraphs can be scored against. However, it is difficult for a person to know all of the possible targets. Different subgraphs in the universe of subgraphs can have different numbers of elements, and different selections of elements. In creating the universe, goals such as a total constraint, or total numbers of nodes, or similar, can be used, which will avoid creating subgraphs which are not of interest in which there are only one or two elements. There is some subtlety involved in creating the universe.

A "subfeature" measures the feature (or more than one feature) for all of the alternatives in the subgraph. Subfeatures can be applied on one (or more) features, or can be a combination of different measurements of feature(s). Referring to the example of FIG. 1, ways to determine the subfeature "advantage" for a subgraph include "total advantage" for all of the elements, and "average advantage" on all of the elements, example. As another example, "advantage with confidence" could be a subfeature, which is a function taking as input the advantage feature and the confidence feature. Or, this could be advantage with confidence by region, which also includes region as an input. Many other subfeatures are possible, primarily based on the types of data which are present in the subnetwork.

"Subfeature scores" are combined together to create "metafeature scores" of a subgraph.

A "metafeature," is made up of a plurality of subfeature measurements (e.g., a plurality of the measurements of the same subfeature, and/or a plurality of different subfeatures, and/or a combination with one or more different metafeatures). The system can predefine standard metafeatures, for example, those which are conventionally used for subnetwork theory. Other metafeatures can be defined by a particular embodiment, and or by a user as desired.

The data which has elements and features 101 is ingested; that data may be conveniently provided from a spreadsheet. Ingestion of the data may be implemented using conventional techniques to obtain data, values, and field names from information such as spreadsheets or tables or networks. The system may have machine learning which predicts subfeatures into which the unassigned columns (features) are categorized based on the field names which equates, e.g., benefit to an "advantage" subfeature; and which predicts metafeatures into which subfeatures are categorized similarly based on the subfeature names.

FIG. 1 utilizes advantage of elements as a representative example of a feature. The Advantage of elements feature 107 (i.e., values in this particular feature for selected subgraphs), and also the indication of which elements are in which subgraphs, is input to functions (e.g., subfeatures 113, 115) to provide, for each of the subgraphs:

Average Advantage 113 on elements of a particular subgaph (this is an example subfeature of Advantage)

Sum on Advantage 115 of items in a particular subgraph (this is a different example subfeature of advantage)

Together these subfeatures 113, 115 give the ADVANTAGE metafeature 123 of the SUBGRAPHS.

In the example of FIG. 1, the Utility Metafeature 125 is made up of:

Advantage Metafeature 123 (discussed above)

Average on Utility 117 of elements in the subgraph

Fibonacci score on the Utility 119 of elements in the subgraph

Figure 2:
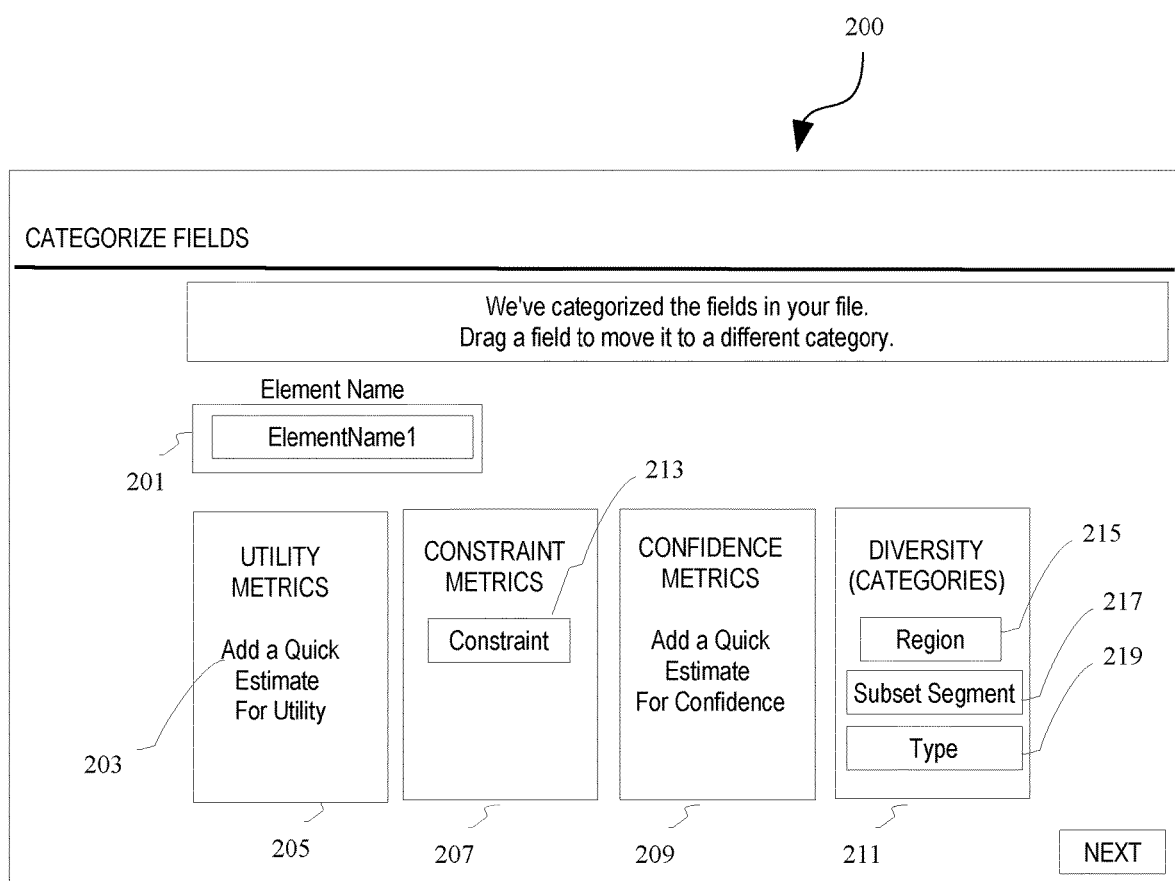
FIG. 2 is an example user interface illustrating a simplified representation of classifying features into categories.

Reference is now made to FIG. 2, an example user interface 200 illustrating a simplified representation of classifying features (e.g., fields in an input file) into categories. Here, the categories include utility metrics 205, constraint metrics 207, confidence metrics 209, and diversity categories 211. Here, the features in the input data include constraint 213, region 215, subnetwork segment 217, innovation type 219, and others, most of which are illustrated as field names in the representative example of Table 1. Based on the field names and/or the data types of the fields, the "constraint" 213 feature is determined to be classified into the "constraint metrics" 207 category, and the region 215, subnetwork segment 217, and innovation type 219 features are determined to be classified into the "diversity" categories 211. Utility and Advantage (not illustrated in this example) can be classified into the "utility metrics" 205 category. Different kinds of measurements can be performed on data of the features which are classified in different categories. A feature could be classified into one, none, or more than one category. It may be convenient while ingesting data to confirm the element name 201 for each of the elements which is extracted from the ingested data.

The column headings for the fields (features) in the data which is imported, such as "Constraint", "Region", can be classified into the categories as illustrated in FIG. 2, in which the categories are preferably pre-defined and also predefined as being associated with particular column headings and/or data types; the data (i.e., values from the raw data) is populated into the system in those categories based on the fields in the raw data. Column headings which are not automatically classified due to being predefined in the system as belonging to particular categories can be assigned by a user to one of the categories (or disregarded), such as by being dragged. Thereby, "features" in the incoming data are assigned with little to no user interaction to "metafeatures." In this illustration, the categories 205, 207, 209, 211 include "Utility Metrics", "Constraint Metrics", "Confidence Metrics", and "Diversity" from standard subnetwork theory; these are exemplary and others could be used instead. In Table 1 as input into FIG. 2, the "constraint" field is classified into the "Constraint Metrics" category, and the "Region", "Subnetwork Segment," and "Type" fields are classified into the "Diversity" categories. If a category which is expected by the system is missing from the input data, the user can be prompted to add an estimate for the category. In the illustration of FIG. 2, in the event that an expected feature (e.g., a field such as a column in Table 1) is missing from the input file, the user may be prompted to input an estimated value 203, such as for "Utility Metrics" 205 and "Confidence Metrics" 209; the estimate can be added per input element.

Figure 3:
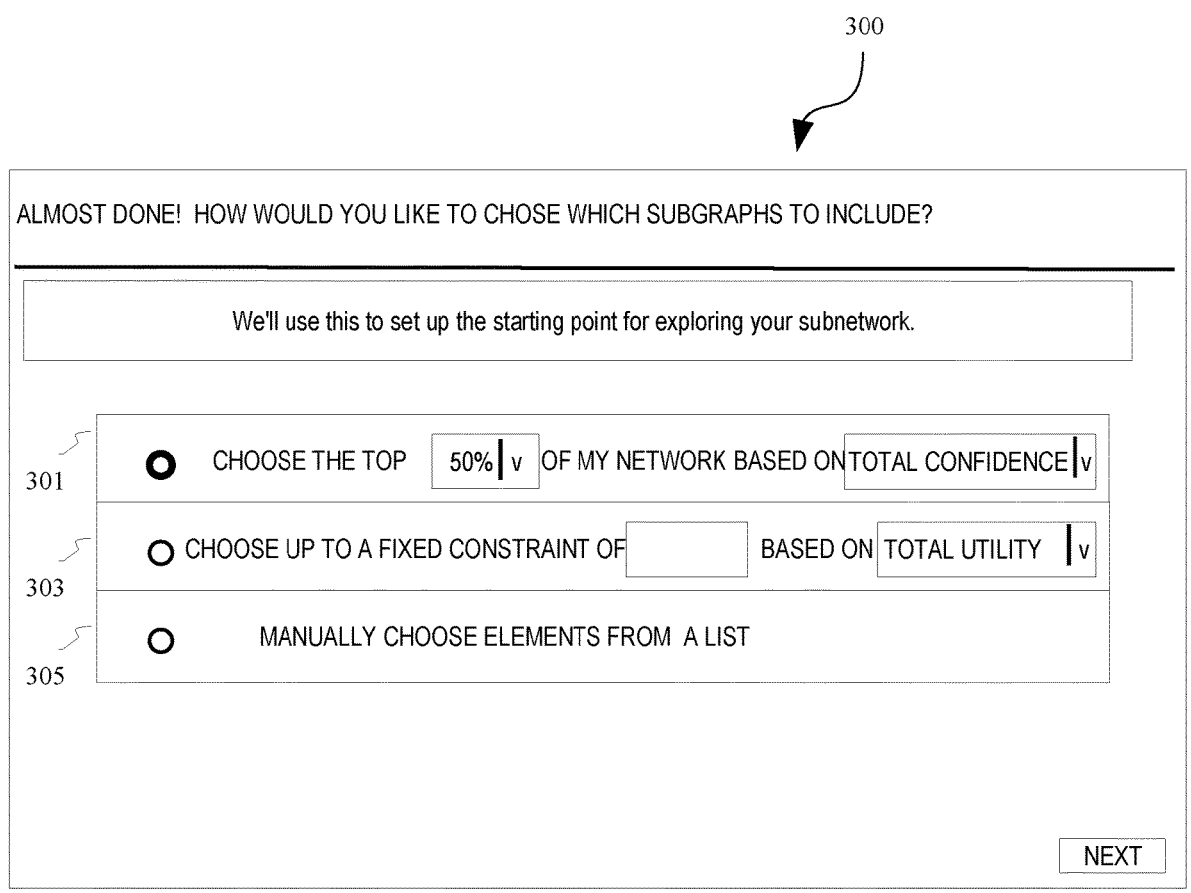
FIG. 3 is an example user interface illustrating selecting subgraphs to include to explore a subgraph.

Constraints can be applied for limiting the universe of subgraphs, and can be predetermined based on conventions, and/or by prompting a user. Reference is now made to FIG. 3, an example user interface 300 illustrating constraints being assigned. In this example, broad constraints are suggested which will eliminate inappropriate subgraphs from being included in the universe, such as defining percentage of subnetwork to be chosen 301, defining maximum fixed constraint of subnetwork to be chosen 303, and/or defining elements which must be included 305 in the subgraphs.

As illustrated in the example of FIG. 3, the user is prompted by the system for constraints to apply in determining which and/or how many of the elements can be selected in a single subgraph. As a concrete example, one conventional problem faced by users is that not all of the elements (which might be, e.g., nodes, vertices or points in the subgraph) can be completed because of features which constraint the system and are a limit. In the example of FIG. 3, a constraint can be selected to limit total constraint, such as "choose the top 50% of my network or subnetwork" based on total constraint, or to "choose up to fixed constraint of X", or "manually choose elements from a list". The universe of subgraphs which is generated includes only subgraphs which more or less meet the constraints, thereby being simpler computationally, and the subgraphs which are ultimately selected from the universe therefore will comply with the constraints.

Figure 4:
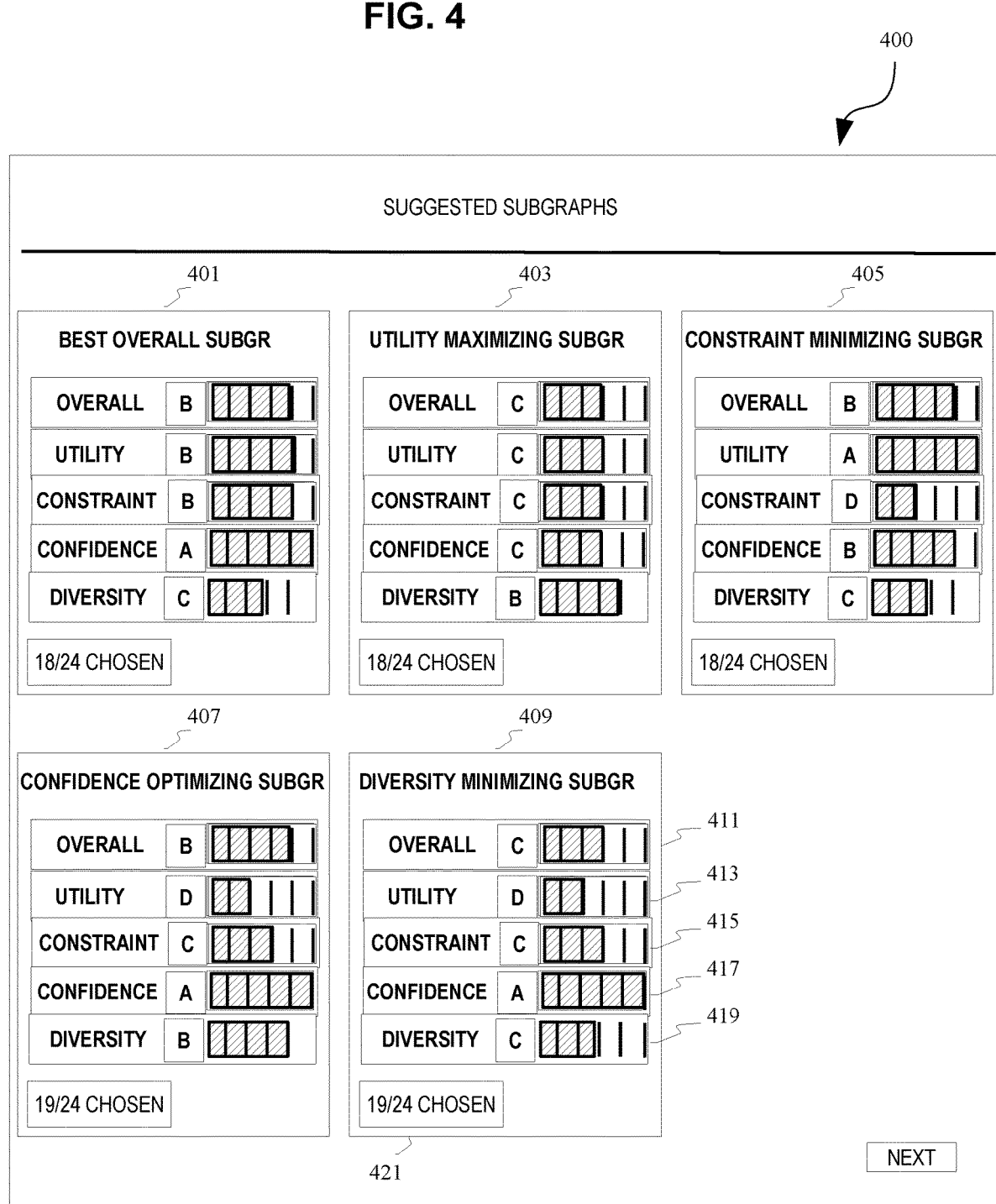
FIG. 4 is an example user interface illustrating selected subgraphs with scored metafeatures for each selected subgraph, for comparison.

Reference is now made to FIG. 4 is an example user interface 400 illustrating selected subgraphs with scored metafeatures for each selected subgraph, for comparison. Subgraphs which are illustrated include a best overall subgraph 401, a utility maximizing subgraph 403, a constraint minimizing subgraph 405, a confidence maximizing subgraph 407, and a diversity optimizing subgraph 409. Referring to the diversity optimizing subgraph 409 as representative, a single subgraph has an overall metafeature score 411, a utility metafeature score 413, a constraint metafeature score 415, a confidence metafeature score 417, and a diversity metafeature score 419; the system can also include other information regarding the subgraph, here represented by how many elements of all possible elements are included in this particular subgraph, e.g., "19/24 chosen".

More particularly, the user interface suggested in FIG. 4 illustrates different subgraphs which are originated based on the raw data, and each of these subgraphs maximizes one of the metafeatures (categories Utility, Constraint, Confidence, and Diversity) and one subgraph is the "best overall" at all of the metafeatures. (Best overall can be determined based on, e.g., an average on all scored metafeatures of a subgraph, in comparison to the universe of available subgraphs, or in other ways.) As shown in FIG. 4, each metafeature in each subgraph has a metafeature score which can be graded. The overall grade for each one of the subgraphs can be based on all of the metafeatures of that subgraph.

With regard to the nodes to choose (i.e., elements within the constraints), the system selects one subgraph from the universe of subgraphs which does best on utility, best on constraint minimizing, best on confidence maximizing, best on diversity, and one that has a nice blend overall (on utility, constraints, confidence, and diversity overall).

In comparison to conventional technology which tries to find a perfect subgraph for each score, this system proposes different subgraphs, each of which is good in different ways from the other subgraphs. This system can propose several subgraphs as candidates for the user to consider, and each of the candidate subgraphs is selected by the system because is very good (i.e., best among the universe of subgraphs) with respect to different metafeatures which were generated based on composites of fields which have data collected by the user, and which more or less comply with the constraints which were provided.

The explanation as to how scores and the grades can constructed is discussed above. A numerical value assigned to the subgraph, e.g., a subgraph which is assigned a "0.12", is not as user friendly for providing understanding to a user as to how good one subgraph is in comparison to another in the context of all of the subgraphs available.

By way of review, Table 1, FIG. 2, FIG. 3 and FIG. 4 collectively illustrate a flow of information in this system. In this example system, the user provides the raw data for the features of the elements, e.g., spreadsheets (Table 1) to the system; the system determines the metafeatures based on features which exist in the spreadsheets and determines which of the values are input into the metafeatures (FIG. 2), and the system uses the different values assigned to the feature(s) across multiple subgraphs (also referred to as "subfeatures") to create a method to evaluate the subgraphs based on the features, which provides scoring information on a subgraph; constraints are applied to determine which elements can be included in each one of the subgraphs (FIG. 3); possible subgraphs are created which comply with the constraints and the system grades the metafeatures in the subgraphs ("graded metafeatures") which are in comparison to the universe of subgraphs so that the universe of possible subgraphs provides context for a comparison of the subgraphs; the metafeatures have been composited in meaningful ways based on available data which is important to the user. Then, the system determines which of the subgraphs to select as candidates; typically the candidate subgraphs (for example those illustrated in FIG. 4) which are presented for user consideration are those which are "best" with respect to one of the metafeatures.

Consequently, in operation, the user can drop one or more spreadsheets into the system, the system makes intelligent guesses as to what the columns in the data mean, the system might request input of some quick estimates, and in response the system provides the candidate subgraphs. This is very user friendly and easy to use.

Another point is that the user can easily grasp which subgraphs are good candidates, and why each of those candidate subgraphs are considered to be "good" particularly in relation to other possible subgraphs.

In a variation, one or more particular subgraphs can be created (such as by the user selecting the elements to include) as the candidate subgraph(s) and graded against the universe of subgraphs.

The system can provide insight generation into a particular subgraph, in which details regarding a particular subgraph are provided, and/or insight into a metafeature compared across subgraphs. Examples are illustrated in the different example user interfaces of FIG. 5, FIG. 6, FIG. 7, and FIG. 8.

Figure 5:
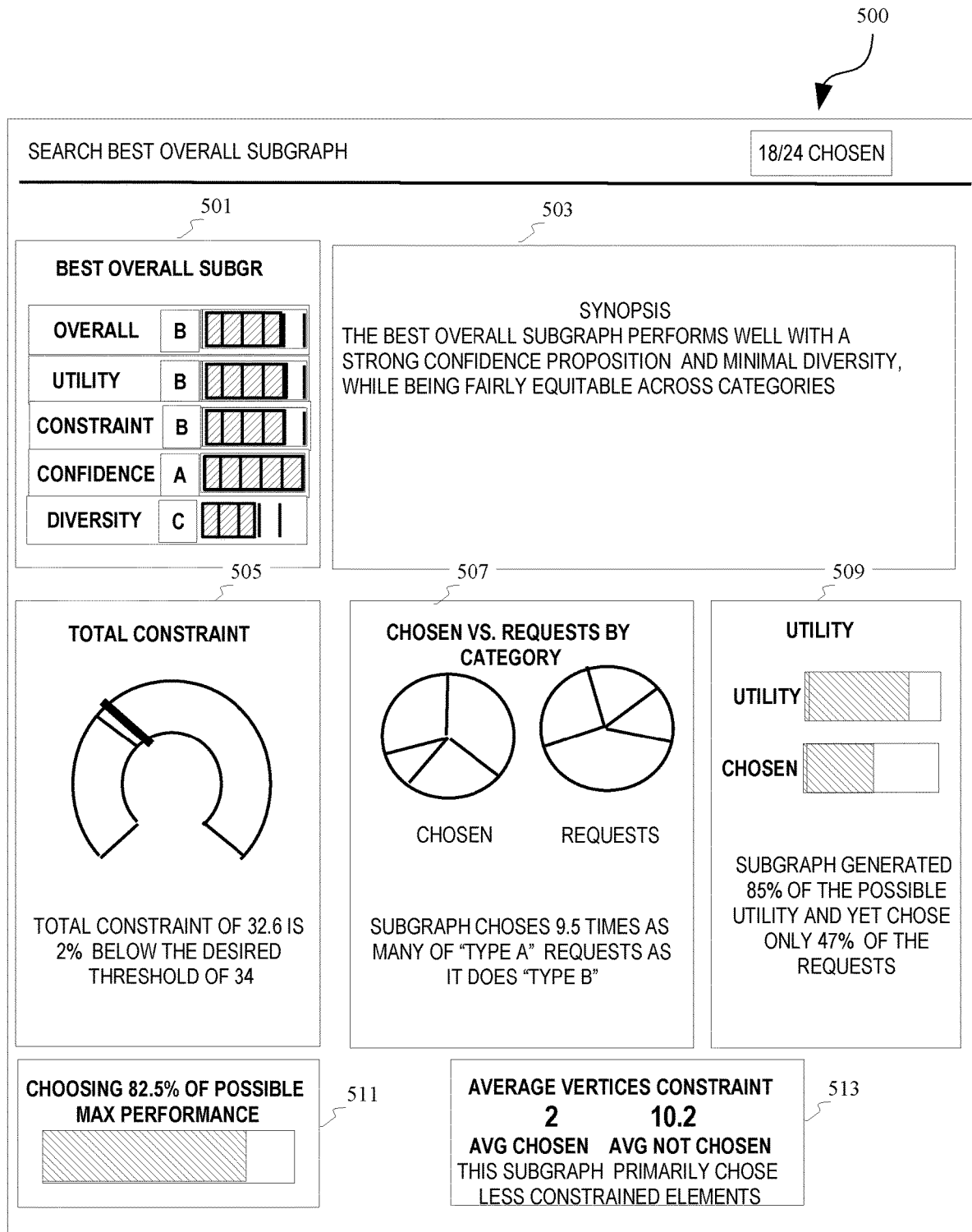
FIG. 5 is an example user interface illustrating a detailed analysis of a subgraph in comparison to information regarding this and/or other subgraphs in the universe of subgraphs.

Reference is now made to FIG. 5, an example user interface 500 illustrating a detailed analysis of a subgraph in comparison to information regarding this and/or other subgraphs in the universe of subgraphs. The example user interface 500 presents information regarding metafeature scores of a subgraph 501, a synopsis 503 which is a textual summary explaining the metafeature values. This example user interface 500 also presents various graphics presenting one or more of the metafeatures and/or subfeatures in comparison to input constraints and/or subfeatures 505, 507, 509, 511, and 513.

FIG. 5 illustrates one of the candidate subgraphs—here, the "Best Overall Subgraph—showing the metafeature scores 501 of that subgraph, and selected details such as details of constraint 505 (e.g., total is 2% below a constraint which is more or less a threshold maximum), 513 (average chosen vs. average not chosen), details of diversity 507 (in this example, chosen vs. requests by type category, e.g., of technical sector), details of utility 509 (percentage of the possible total utility vs. percentage of requests actually chosen), details of how much is chosen 511, and others (not illustrated). This allows a user to delve deeper into the data for that particular subgraph, such as in comparison to the constraints, possible totals, comparisons and/or statistics regarding elements which are in the subgraph and/or elements which are not in the subgraph, and/or statistics in comparison to other available subgraphs, and the like. One of skill in the art will appreciate that various other combinations of information details can be presented based on the present disclosure.

Figure 6A:
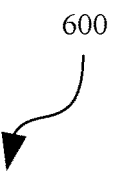

Reference is now made to FIG. 6A and FIG. 6B (collectively, FIG. 6), which illustrate elements in or not in a particular subgraph and the metafeature impact scores for each metafeature of each element. A user interface 600 can provide a listing of elements in a particular subgraph (FIG. 6A) and elements not in that subgraph (FIG. 6B).

This variation of analysis is an impact analysis which illustrates an impact of each of the alternatives (i.e., elements) which are in the subgraph, and an impact of each of the elements which are not included in the particular subgraph, on the scored metafeature of the subgraph. In this example, the scale is –5 to +5, where a –5 is totally negative impact and +5 is totally positive impact of that element on that metafeature, given the value of the feature(s) composited into that metafeature vs. the subgraph itself within the universe of subgraphs. The question which this impact analysis answers is how changing the elements which are in or not in the subgraph might affect each individual scored metafeature.

In the example of FIG. 6, the elements which are in the subgraph mostly have a positive impact on the total score of that scored metafeature. One can easily see which elements have the most impact on a total score of a scored metafeature. Colors or shading can be used to correspond to positive or negative impact (e.g., green and red, respectively), and intensity of color can be used to correspond to the intensity of the impact, e.g., white correspond to neutral, light green to slightly positive, intense green to very positive, etc.

Given the impact information, a user can decide to create a subgraph to include certain elements, or to revise elements which are included in or excluded from a subgraph considering the impact analysis. A revised subgraph in which elements have been added in or excluded from a previously existing subgraph will change the values which are input to the subfeatures and consequently the values which are input to the metafeatures and therefore will change the metafeature scores of that revised subgraph in comparison to the previously existing subgraph, all of which involve values normalized to the universe of subgraphs.

In this regard, note that looking at how valuable an element is in isolation can be meaningless. For example, if the subgraphs under consideration address how to staff a football team, adding a second excellent quarterback is useless and adds no value even if the element in isolation appears to be valuable.

Referring back to Section 2.4 above, regarding the total advantage for elements in subgraph, this brings up an example question as to how a user knows whether the "advantage" is good. The goodness of a value is normalized to a target (if provided), or normalized in respect to all subgraphs in the universe of subgraphs.

Figure 7:
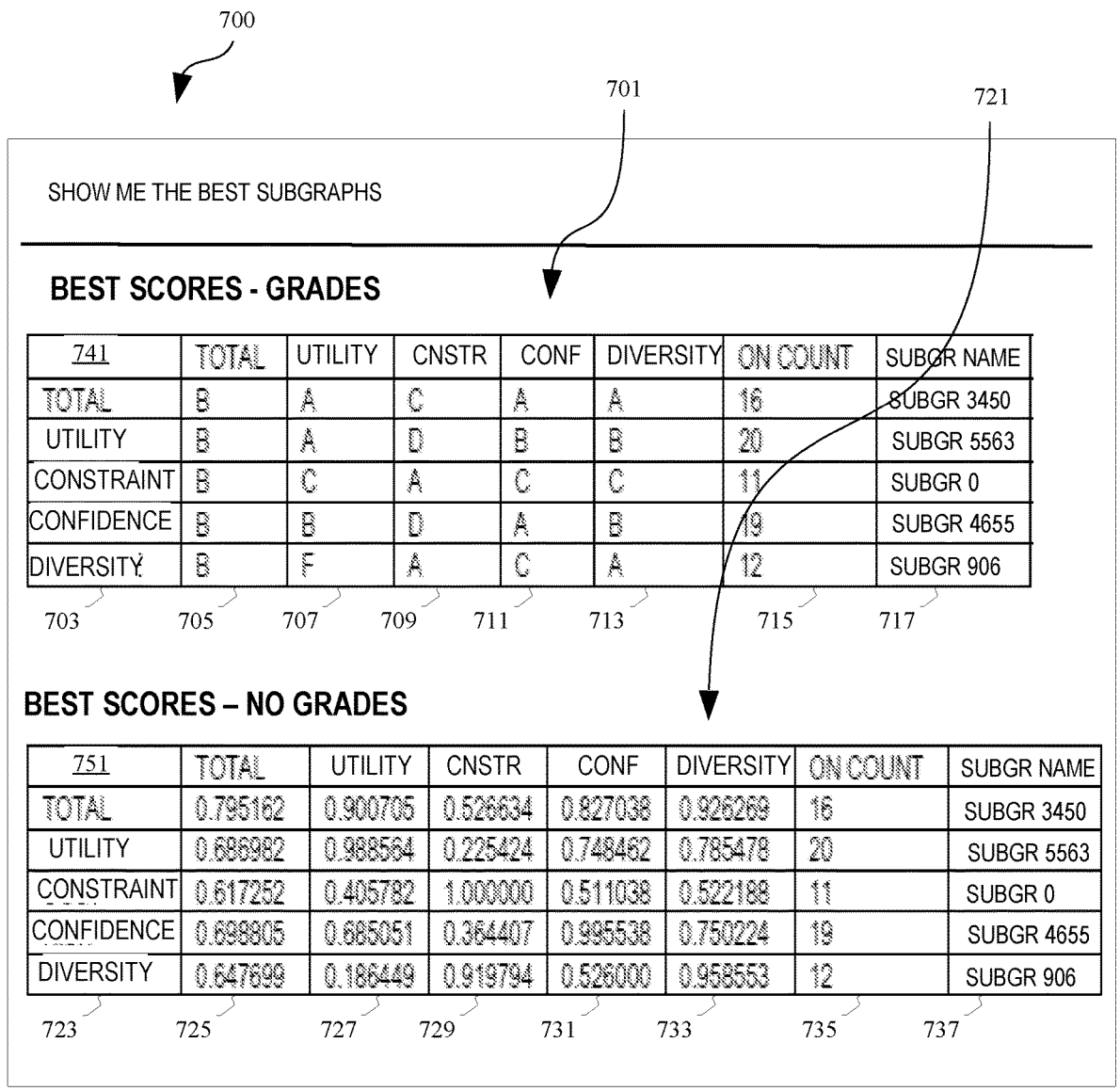
FIG. 7 is an example user interface illustrating best metafeature scores as grades and as values.

Reference is now made to FIG. 7, an example user interface 700 illustrating best metafeature scores as letter grades 701 and as numerical values 703. Here, tables 741, 751 with the candidate subgraphs 703, 723 (namely, best total score, best utility score, best constraint score, best confidence score, and best diversity) are presented. Each table 741, 751 includes the metafeature score for each of the candidate subgraphs, here with respect to total metafeature score 705, 725, utility metafeature score 707, 727, constraint metafeature score 709, 729, and confidence metafeature score 713, 733. In this example, each table 741, 751 also indicates, for each candidate subgraph, the elements in the subgraph ("ON count") 715, 735, and the subgraph name 717, 737. To be clear, the rows in FIG. 7 are subgraphs, and the columns in FIG. 7 are values.

One point of the system is to present different subgraphs (for example, FIG. 4 and/or FIG. 7) and to give the subgraphs context. The scoring mechanism provides context and makes the analysis easy to grasp. Among other things, FIG. 7 illustrates that the scores as letter grades 701 are easier to grasp promptly than the scores as numerical values 703 which yielded the letter grades. However, FIG. 7 also illustrates that the numerical value can suggest how different a letter grade might be. For example, in FIG. 4, for the "total" metafeature 705, 725, the letter grade is "B" yet the numerical value ranges from 0.617252 to 0.795162.

The metafeature grades can be detailed in other understandable ways. FIG. 8 is an example user interface 800 illustrating a detailed analysis of the same metafeature across different selected subgraphs. This example has a summary of details for each of the candidate subgraphs 801, 803, 805, 807, 809, which were selected as the "best" for one of the different metafeatures, namely, for total 801, utility 803, constraint 805, confidence 807, and diversity 809; the metafeature score examined in each of the summaries is the "utility" metafeature score. Referring to the summary for the "constraint" candidate subgraph 805, the score is presented (here as a dial graph 813) and the values 801 determined by the subfeatures are illustrated in relation to each of the metafeatures in which they are used.

In short, FIG. 8 illustrates grades for all of the candidate subgraphs 801, 803, 805, 807, 809 on the utility metafeature, represented on dials. The actual numerical values of the subfeature scores which make up the metafeature score can also be displayed (as illustrated), but the meaning is less readily grasped by a user. With reference to this illustration, for the graded "utility" metafeature score, it can be understood that the best subgraph is the "Utility" subgraph 803 which has an A, and the "Total Overall" subgraph 801 has a different A with a lower "utility" score; the worst subgraph is the "Diversity" subgraph 809.

FIG. 9 illustrates a computer implementation, more particularly, a block diagram illustrating relevant portions of a computer 901, on which is provided a computer-implemented subgraph analysis with context provided by compositing subfeatures of a subgraph based on transformed information regarding features of elements in the subgraph. The computer 901 may include one or more controllers 903, a processor 909, an input/output (i/o) interface here represented by communication port 939 for communication such as over a network, a memory 911, a display 905 (optional), and/or a user input device (also optional) such as a keyboard 907. Alternatively, or in addition to the keyboard 907, a user input device may comprise one or more of various known input devices, such as a keypad, a computer mouse, a touchpad, a touch screen, a trackball, and/or a keyboard. The display 905 may present information to the user by way of a conventional liquid crystal display (LCD) or other visual display, and/or by way of a conventional audible device (for example, a speaker) for playing out audible messages. Portions of the computer 901 are well understood to those of skill in this area and have been omitted to avoid obscuring the discussion.

The processor 909 may comprise one or more microprocessors and/or one or more digital signal processors. The memory 911 may be coupled to the processor 909 and may comprise a read-only memory (ROM), a random-access memory (RAM), a programmable ROM (PROM), and/or an electrically erasable read-only memory (EEPROM). The memory 911 may include multiple memory locations for storing, among other things, an operating system, data and variables 913 for programs executed by the processor 909; computer programs for causing the processor to operate in connection with various functions such as to provide a plurality of subgraphs 913, to handle subfeatures 917, to handle metafeatures 919, to composite the subfeatures of each metafeature to provide metafeature scores for each subgraph 921, to present selected subgraphs with graded metafeatures 923, to input the subgraphs into a subfeature and provide the result as a subfeature score 925, to input the subgraphs with subfeature scores into a metafeature and to provide as a result the graded metafeature(s) for each subgraph 927, and/or other processing 929; the subgraph storage memory 931 in which the universe of subgraphs is stored; and store 933 for other information used by the processor 909. The computer programs may be stored, for example, in ROM or PROM and may direct the processor 909 in controlling the operation of the computer 901. Much of the details regarding the processing and analysis which occurs in the computer program(s) has already been discussed above and will be understood therefrom, and therefore many details have been omitted from the following to avoid being repetitious.

The user may invoke functions accessible through the user input device 907. Responsive to manual signaling received from the user input device 907, in accordance with instructions stored in memory 911, or automatically upon receipt of certain information via the communication port 939, the processor 909 may direct information in storage or information received by the user input device to be processed by the instructions stored in memory 911.

The display 905 may present information to the user by way of a text and/or image display 905 upon which information may be displayed. The display 905 may present information to the user by way of an available liquid crystal display (LCD), plasma display, video projector, light emitting diode (LED) or organic LED display, cathode ray tube, or other visual display; and/or by way of a conventional audible device (such as a speaker, not illustrated) for playing out audible messages.

The processor 909 can be programmed to provide a plurality of subgraphs 913, such as from a subgraph storage memory 931 that stores the universe of subgraphs. The subgraphs can be generated from input data which includes elements and features for all of the elements 951. Elements and features which are input, and subgraphs and the universe of subgraphs which are generated from the input elements and features, have been exhaustively discussed above. In an example, one or a plurality of spreadsheets, and/or a combination of different data sources, can provide the elements and features 951. The universe of subgraphs can be retrieved from the subgraph storage memory 931, and provided for further analysis thereof.

The processor 909 can be programmed to handle subfeatures 917. As further discussed herein, for each subfeature of a plurality of subfeatures, the different values assigned to one or more feature can be used to create a method to evaluate the plurality of subgraphs on the one or more features, and the created method is then the subfeature which provides scoring information on a subgraph based on the relevant information for the feature, for the elements which are included in the subgraph.

The processor 909 can be programmed to handle metafeatures 919. For each metafeature, plural subfeatures are selected (for example, predefined) to be composited into the metafeature. As discussed above, the subfeatures might be assigned to one or more predetermined metafeatures based on a predefined association between a field name of the subfeature and one or more metafeatures. In an embodiment, the system can allow a subfeature to be manually assigned or reassigned by a user to one of the metafeatures.

The processor 909 can be programmed to composite the subfeatures of each metafeature to provide metafeature scores for each subgraph 921. For each subgraph, the plural subfeatures which have been selected for one metafeature are composited to provide the metafeature score (for that metafeature) for that subgraph. It is expected that there are a plurality of metafeatures which are evaluated, where the same metafeatures are evaluated for all of the subgraphs in the universe of subgraphs. Raw subfeature scores and normalized subfeature scores provided from each subfeature, and the metafeature scores provided from each metafeature, can be stored, such as in the subgraph storage memory storing the universe of subgraphs 931.

The processor 909 can be programmed to present selected subgraphs with scored metafeatures 923; graded metafeatures are a particularly user friendly variety of scored metafeatures although non-graded values may be presented. Subgraphs are selected, for example, by determining for each of the metafeatures, the subgraph which has the "best" metafeature score among the subgraphs in the universe 931, and the selected subgraphs can be referred to as "candidate" subgraphs. The selected subgraphs are presented to the user, for example output to the display 905, along with the scored, e.g., graded, metafeatures as context for comparing the selected (e.g., "candidate") subgraphs. It can be noted that each of the selected subgraphs has a set of elements which differ from the other selected subgraphs.

The processor 909 can be programmed to input the subgraphs, or more particularly, the relevant feature of each the subgraphs, into a subfeature and provide the result as a subfeature score 925 for each of the subgraphs. As discussed above in much more detail, a subfeature score for a particular subgraph is responsive to the values of the feature(s) in the elements in the particular subgraph which are input to the subfeature.

The processor 909 can be programmed to input the subgraphs with subfeature scores into a metafeature and to provide as a result the scored, e.g., graded, metafeature(s) for each subgraph 927. This has been discussed above in great detail.

Optionally, other components may be incorporated in the computer 901 to produce other actions. Further, the computer 901 can send and receive transmissions via known networking applications operating with the communication port 939 connected to a network, for example, a local area network, intranet, or the Internet and support software.

It should be understood that various embodiments are described herein in connection with logical groupings of programming of functions. One or more embodiments may omit one or more of these logical groupings. Likewise, in one or more embodiments, functions may be grouped differently, combined, or augmented. For example, in one or more embodiments, the universe of subgraphs 931 might be omitted and/or can be distributed amongst different computers. In addition, some of these functions may be performed predominantly or entirely on one or more remote computers (not illustrated); and therefore such functions can be reduced or omitted from the processor 909 and distributed to the remote computer. Similarly, the present description may describe various collections of data and information. One or more embodiments can provide that collections of data and information can be distributed, combined, or augmented, or provided locally (as illustrated) and/or remotely (not illustrated).

As will be understood in this field, besides the functions discussed above, the memory 911 can include other miscellaneous information in a miscellaneous data and other storage 933, along with the usual temporary storage and other instructions for other programs not considered herein.

The computer 901 can include one or more of the following, not illustrated: a flash memory, a floppy disk drive, an optical drive, a hard disk drive, a digital video disk, a removable USB drive, and/or a CD ROM or digital video/versatile disk, which can be internal or external, and variations and evolutions thereof. The number and type of drives can vary, as is typical with different configurations, and may be omitted. Instructions that are executed by the processor 309 and/or an ANP model can be obtained, for example, from the drive, via the communication port 939, or via the memory 911. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 909, memory 911, a disk drive and/or removable storage medium are referred to as "computer-readable storage media" and provide non-transitory storage of computer programs and data.

FIG. 10 provides an illustration of a procedure 1001 for analysis of subgraphs. Most of the details implicated by FIG. 10 have been discussed above and are not repeated herein. However, FIG. 10 is useful to illustrate the procedure and provide a more complete understanding. The procedure can conveniently be implemented as instructions executed on the computer of FIG. 9, or other appropriate appropriately configured.

In the procedure for analysis of subgraphs 1001, raw data is ingested 1003, where the raw data is elements, and each of the elements shares the same features (e.g., fields) but has different data values in the features, and a universe of subgraphs is created which is a plurality of subgraphs each indicating which different combinations of the elements are in said each subgraph (and those elements which are not indicated as being in the subgraph are not included in that subgraph). Note that a universe of subgraphs may be created one time, and then the remaining steps might be repeated to provide analysis of the subgraphs. Accordingly the ingestion 1003 of raw data might not be performed every time the subgraphs are analyzed. Note that data in the subgraphs can be analyzed to provide raw values and scored values and possibly stored in association with the universe of subgraphs.

The procedure 1001 also will provide 1005 the plurality of subgraphs wherein each subgraph has a plurality of elements, and each of the elements has a plurality of features with different values. For example, each subgraph can indicate elements which are included in the subgraph.

The procedure 1001 will create 1007 a plurality of subfeatures. For each subfeature, the procedure uses the different values assigned to one or more features in the subgraph to create a method to evaluate the subgraphs on the one or more features; this is one of the subfeatures which provides scoring information on one of the subgraphs. The subfeatures are created considering the features in the subgraphs and therefore subfeatures can be created by looking at a small subset of the data which is sufficient to name the fields. Then, for each of the subgraphs, the procedure 1001 can calculate a raw subfeature score, i.e., perform the subfeature on the data values of the feature for the elements which in the subgraph. As an example, for each of the subgraphs in the universe, a raw total and a raw average can be calculated for, e.g., advantage for those elements which are in the subgraph, where the raw total advantage and the raw average advantage are each a raw subfeature score. The raw subfeature scores are normalized, against a target (if a target is specified for that subfeature) or against all of the subfeature scores in the universe for that subfeature. The normalization of the raw subfeature scores reflects how "good" a raw subfeature score is relative to what is possible in the universe or what target is desired. The normalization of the raw subfeature scores on all of the subgraphs in the same way allows different subgraphs to be compared meaningfully. The normalized subfeature scores provide scoring information on a subgraph.

The procedure 1001 will create 1009 a plurality of metafeatures. For each metafeature, the procedure determines plural subfeatures among the plurality of subfeatures which are to be composited into said each metafeature. How subfeatures and metafeatures are predefined was discussed above in more detail. It is possible that the data which is provided will not support all subfeatures and/or metafeatures which are predefined. Subfeatures and/or metafeatures which are not supported need not be included in the analysis, or as discussed above values might be manually provided to estimate a missing subfeature(s). For each subgraph, the procedure 1001 will composite the plural subfeatures of each metafeature to provide the metafeature score (per each metafeature) for each subgraph. The verb "composite" or "compositing" (and verb and adverb variations) as used in this document and in the claims (now or as amended) is defined as referring to a function of two or more real variables that output a real variable. That is, two or more of the normalized subfeature score(s) and/or metafeature score(s) for that subgraph are composited as defined by a metafeature, which generates the a metafeature score from those input scores. As further discussed herein, the metafeature scores can be graded, which tends to be more user friendly. It should be mentioned that the procedure can perform all or a subset of the subfeatures and/or metafeatures on all of the subgraphs in the universe; therefore all of the subgraphs in the universe can be meaningfully analyzed.

In some embodiments, the procedure 1001 will determine 1011 which of the subgraphs in the universe of subgraphs are most optimized (among the universe of subgraphs) for a best metafeature score of at least one of the metafeatures, and will select the subgraphs which are determined as most optimized as candidates to be presented to a user for consideration and/or possible further analysis. In this way, a user can be presented with, for example, four to five subgraphs which explore and/or compare the effect on desirable metafeatures of include or excluding various elements.

The procedure 1001 can present 1013 selected subgraphs from the universe of subgraphs, together with their metafeature scores, as context for comparing the selected subgraphs. Various ways of presenting the subgraphs have been discussed above by way of example.

In some embodiments, the procedure 1001 will analyze 1015 the subgraphs, particularly the candidate subgraphs, such as by impact analysis, comparison of metafeature scores across subgraphs, and/or drill down to subfeature(s), metafeature(s), and/or underlying data analysis, and variations thereof.

An analysis of subgraphs can be ended 1017, such as when a user indicates they are done.

The above is sometimes described in terms of a single user, for ease of understanding and illustration. However, it is understood that multiple users can be accommodated in various embodiments.

IV. Supplemental Glossary

Terms as used in this document and in the claims herein and as the claims may be amended are to be interpreted first as defined above in Section II, and it is to be noted that the inventors have acted as their own lexicographer for this document; and if not interpretable at the first, then at a second level as understood to one of skill in the art of optimization, multi-objective function optimization, and combinatorics; and if not interpretable at the first and the second level, then at a third level as understood to one of skill in the arts of both computer science and mathematics particularly with an emphasis on multi-criteria decision making; and then if not interpretable according to the first, the second level, and the third level, according to a more general dictionary.

One of skill in this art will know that the values (content) in the features of the elements and/or graphs and/or subgraphs can be represented as a matrix (or series of matrices), or as a network, or as a table, or in a spreadsheet for example.

The claims may use the following terms, which are defined to have the following meanings for the purpose of the claims herein. Other definitions have already been specified in this document.

The term "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The phrase "automatically without manual intervention," when used in a claim, is defined to mean that the particular step occurs after the step is initiated until limitations recited in the step are finished without requiring a user to provide input to a processor.

V. Implementation and Technical Notes

The above discussion has assumed that the reader has a sufficient technical background for appreciating the points made. This section provides some supplementary implementation and/or technical notes which discuss some technical information that may be relevant. In addition, one of skill in this art will appreciate the various uses for the concepts and implementations discussed herein, such as will occur for a Department of Transportation (e.g., choosing maintenance and upgrades and the like), information technology departments (e.g., choosing schedules and parts), sports teams, banking, and many other uses.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users and/or over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program which may be stored in a memory and loaded into the CPU, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, discussion of such software and ICs, if any, will be limited to essentials with respect to the principles and concepts used by the exemplary embodiments.

The various embodiments which demonstrate a method and/or system and/or non-transitory computer-readable medium for analysis of subgraphs with context provided by compositing subfeatures of a subgraph based on transformed information regarding features of elements in the subgraph have been discussed in detail above. It should be further noted that the above-described processes can be stored as instructions in a computer-readable storage medium. When the instructions are executed by a computer, for example after being loaded from the computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which may sometimes be asserted to be mental operations performed by a human operator. While the discussion herein may contemplate a human, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium now known or heretofore conceived, and variations thereof, provided that such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on integration and/or incorporation of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network for any information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, JavaScript, jQuery, CSS, Objective-C, HTML display format e.g. using XML, Phtyon, PHP, Git, GitHub, Ruby, and others.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

Any presently available or future developed computer software language and/or hardware components can be employed in various embodiments. For example, at least some of the functionality discussed above could be implemented using C, C++, Java, C#, SQL, R, or any assembly language appropriate in view of the processor being used.

One or more embodiments may include a process and/or steps. Where steps are indicated, they may be performed in any order, unless expressly and necessarily limited to a particular order. Steps that are not so limited may be performed in any order.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An apparatus comprising:
    a subgraph storage memory that stores a plurality of subgraphs each populated with data classified into features based on data title, wherein each of the plurality of subgraphs has a plurality of elements, wherein each of the plurality of elements is a nodal element having a plurality of features with different values;
    a processor in communication with the subgraph storage memory, the processor being configured to:
        generate, from the plurality of subgraphs, a universe of different subgraphs, wherein the subgraphs included in the universe each has elements which, in combination, satisfy at least one predetermined constraint on which combination of elements are chosen and not chosen in the subgraph,
        for each subfeature of a plurality of subfeatures, use the different values assigned to a combination of an element of the plurality of elements and one or more of the plurality of features to evaluate the plurality of subgraphs in the universe based on the one or more of the plurality of features, as the subfeature which provides scoring information on the subgraph;

for each metafeature, select plural subfeatures among the plurality of subfeatures to be composited into the metafeature; and for each subgraph in the universe, composite the plural subfeatures of each metafeature to provide metafeature scores for each subgraph;

generate a set of selected subgraphs that are optimized for a best metafeature score; and present, for user consideration, the selected subgraphs in the universe of different subgraphs with corresponding metafeature scores for comparing the selected subgraphs among available subgraphs in the universe, wherein each of the selected subgraphs has different selected elements.

2. The apparatus of claim 1, wherein the processor is further configured so that a subfeature takes in the different subgraphs in the universe and provides, as a result, subfeature scores for each of the different subgraphs, wherein each of the subfeature scores is responsive to a plurality of values of at least one feature in the elements in one of the different subgraphs.

3. The apparatus of claim 2, wherein the processor is further configured so that a metafeature takes in the different subgraphs in the universe which have the subfeature scores, and provides as a result, the metafeature scores for each of the different subgraphs, wherein each of the metafeature scores is responsive to a composite of a plurality of the subfeature scores and/or another metafeature score of one of the different subgraphs.

4. The apparatus of claim 1, the processor is further configured to, prior to providing the plurality of subgraphs, transform raw data in the plurality of different subgraphs into scored values.

5. The apparatus of claim 1, wherein the processor is further configured to perform an analysis of an impact of at least one of the elements on a given subgraph of the different subgraphs, wherein the analyzed impact includes both impact of elements chosen in the given subgraph and impact of elements not chosen in the given subgraph.

6. The apparatus of claim 1, wherein the processor is further configured to score the metafeature scores against the universe of different subgraphs.

7. The apparatus of claim 1, wherein the processor is further configured to, responsive to the metafeatures which result from the compositing of subfeatures, use the metafeatures which result from the compositing of subfeatures and create pre-determined metafeatures for each subgraph of the different subgraphs.

8. The apparatus of claim 1, wherein the processor is further configured to determine respective subgraphs in the universe of different subgraphs which are most optimized among the universe of different subgraphs for a best metafeature score of at least one of the metafeatures.

9. A non-transitory computer-readable storage medium encoded with computer executable instructions, wherein execution of the computer executable instructions by one or more processors causes a computer to perform steps of:

providing a plurality of subgraphs each populated with data classified into features based on data title, wherein each of the plurality of subgraphs has a plurality of elements, wherein each of the plurality of elements is a nodal element having a plurality of features with different values;

generating, from the plurality of subgraphs, a universe of different subgraphs, wherein the subgraphs included in the universe each has elements which, in combination, satisfy at least one predetermined constraint on which combination of elements are chosen and not chosen in the subgraph;

for each subfeature of a plurality of subfeatures, using the different values assigned to a combination of an element of the plurality of elements and one or more of the plurality of features to evaluate the plurality of subgraphs in the universe based on the one or more of the plurality of features, as the subfeature which provides scoring information on the subgraph;

for each metafeature, selecting plural subfeatures among the plurality of subfeatures to be composited into the metafeature; and for each subgraph in the universe, compositing the plural subfeatures of each metafeature to provide metafeature scores for each subgraph;

generating a set of selected subgraphs that are optimized for a best metafeature score; and presenting, for user consideration, the selected subgraphs in the universe of different subgraphs with corresponding metafeature scores for comparing the selected subgraphs among available subgraphs in the universe, wherein each of the selected subgraphs has different selected elements.

10. The non-transitory computer-readable storage medium of claim 9, wherein a subfeature takes in the different subgraphs in the universe and provides, as a result, subfeature scores for each of the different subgraphs, wherein each of the subfeature scores is responsive to a plurality of values of at least one feature in the elements in one of the different subgraphs.

11. The non-transitory computer-readable storage medium of claim 10, wherein a metafeature takes in the different subgraphs in the universe which have the subfeature scores, and provides as a result, the metafeature scores for each of the different subgraphs, wherein each of the metafeature scores is responsive to a composite of a plurality of the subfeature scores and/or another metafeature score of one of the different subgraphs.

12. The non-transitory computer-readable storage medium of claim 9, further comprising, prior to providing the plurality of subgraphs, transforming raw data in the plurality of different subgraphs into scored values.

13. The non-transitory computer-readable storage medium of claim 9, further comprising performing an analysis of an impact of at least one of the elements on a given subgraph of the different subgraphs, wherein the analyzed impact includes both impact of elements chosen in the given subgraph and the impact of elements not chosen in the given subgraph.

14. The non-transitory computer-readable storage medium of claim 9, further comprising responsive to the metafeatures which result from the compositing of subfeatures, using the metafeatures which result from the compositing of subfeatures and create pre-determined metafeatures for each subgraph of the different subgraphs.

15. The apparatus of claim 1, wherein a context is presented to indicate how many of the elements are chosen in the selected subgraphs in the universe.

16. The non-transitory computer-readable storage medium of claim 9, wherein a context is presented to indicate how many of the elements are chosen in the selected subgraphs in the universe.

* * * * *